US011711254B2

(12) United States Patent
Moghaddam et al.

(10) Patent No.: US 11,711,254 B2
(45) Date of Patent: Jul. 25, 2023

(54) SUB-NANOSECOND RF SYNCHRONIZATION FOR MIMO SOFTWARE DEFINED RADIO SENSOR NETWORKS

(71) Applicants: UNIVERSITY OF SOUTHERN CALIFORNIA, Los Angeles, CA (US); CALIFORNIA INSTITUTE OF TECHNOLOGY, Pasadena, CA (US)

(72) Inventors: Mahta Moghaddam, Los Angeles, CA (US); Samuel M. Prager, Los Angeles, CA (US); Mark S. Haynes, Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 17/576,806

(22) Filed: Jan. 14, 2022

(65) Prior Publication Data

US 2022/0239541 A1 Jul. 28, 2022

Related U.S. Application Data

(60) Provisional application No. 63/137,887, filed on Jan. 15, 2021.

(51) Int. Cl.
*H04L 27/26* (2006.01)
*H04B 1/00* (2006.01)
*H04W 56/00* (2009.01)

(52) U.S. Cl.
CPC ....... *H04L 27/2663* (2013.01); *H04B 1/0003* (2013.01); *H04L 27/266* (2013.01); *H04W 56/001* (2013.01)

(58) Field of Classification Search
CPC . H04L 27/2663; H04L 27/266; H04B 1/0003; H04W 56/001; H04J 3/0667
See application file for complete search history.

(56) References Cited

U.S. PATENT DOCUMENTS

| 2001/0053699 | A1* | 12/2001 | McGrady | ................. G01S 5/14 455/513 |
| 2018/0132199 | A1* | 5/2018 | Zhang | ............... H04W 56/0065 |
| 2020/0403652 | A1* | 12/2020 | Goff | ..................... H04B 1/7075 |

FOREIGN PATENT DOCUMENTS

WO   WO-2021158609 A2 *  8/2021  ........... G01S 1/0428

* cited by examiner

*Primary Examiner* — Dac V Ha
(74) *Attorney, Agent, or Firm* — Snell & Wilmer L.L.P.

(57) ABSTRACT

This disclosure presents distributed and decentralized synchronization for wireless transceivers. The disclosed system, device, and method achieve sub-nanosecond synchronization using low-cost commercial off the shelf software defined radios. By providing a decentralized mechanism that does not rely on a hierarchical master-slave structure, networks constructed as disclosed are robust to sensor drop-out in contested or harsh environments. Such networks may be used to create phased array radars and communication systems without requiring wired connections to distribute a common clock or local oscillator reference.

20 Claims, 23 Drawing Sheets

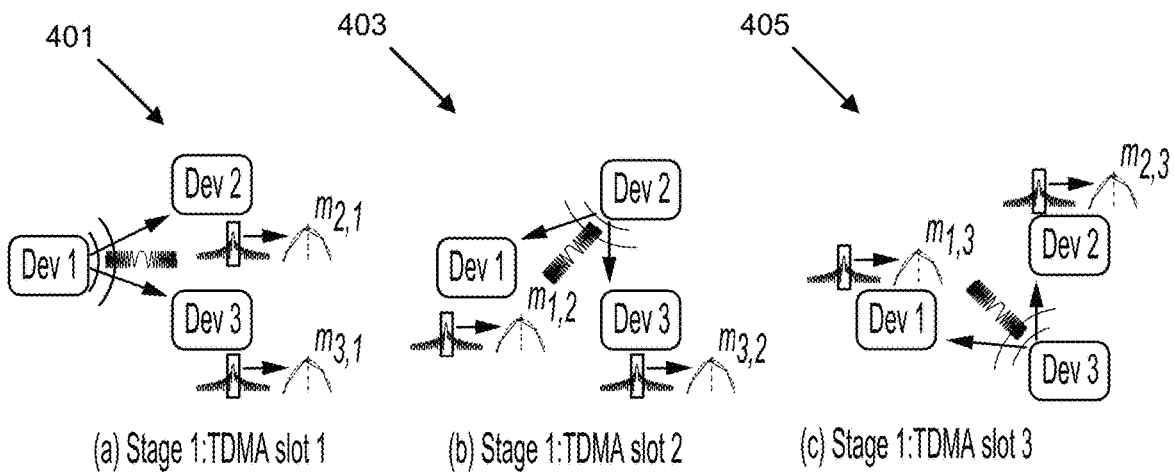
(a) Stage 1:TDMA slot 1
FIG. 4A
(b) Stage 1:TDMA slot 2
FIG. 4B
(c) Stage 1:TDMA slot 3
FIG. 4C
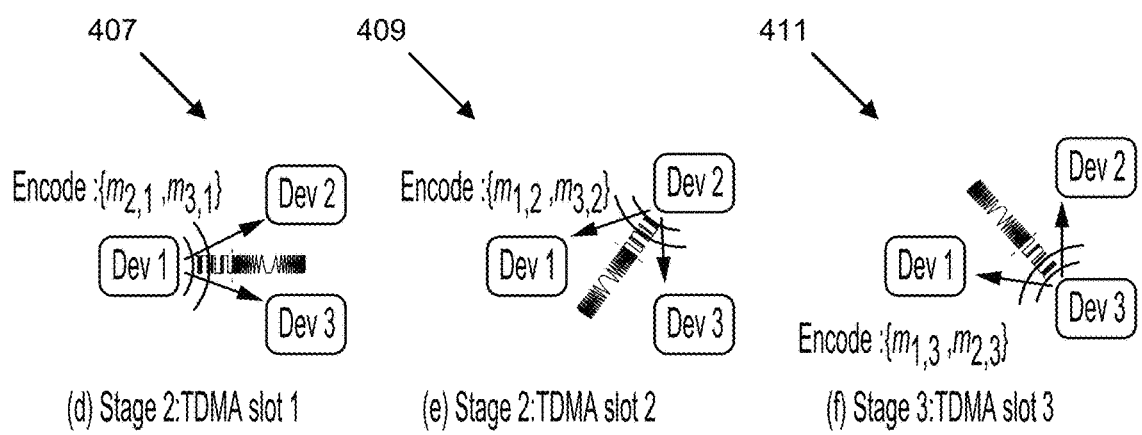
(d) Stage 2:TDMA slot 1
FIG. 4D
(e) Stage 2:TDMA slot 2
FIG. 4E
(f) Stage 3:TDMA slot 3
FIG. 4F

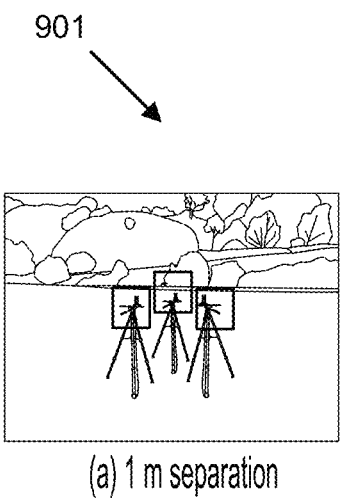
(a) 1 m separation
FIG. 9A
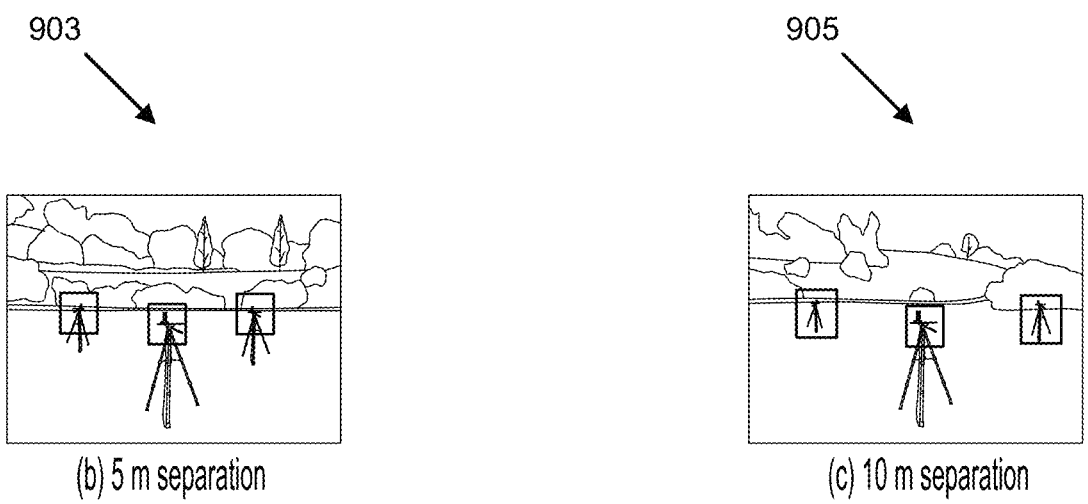
(b) 5 m separation
FIG. 9B
(c) 10 m separation
FIG. 9C (a) 1 m sensor separation (b) 5 m sensor separation

SUB-NANOSECOND RF SYNCHRONIZATION FOR MIMO SOFTWARE DEFINED RADIO SENSOR NETWORKS

CROSS-REFERENCE TO RELATED APPLICATIONS

This application is based upon and claims priority to U.S. provisional patent application 63/137,887 entitled "SUB-NANO SECOND RF SYNCHRONIZATION FOR MIMO SOFTWARE DEFINED RADIO SENSOR NETWORKS" and filed on Jan. 15, 2021, the entire content of which is incorporated herein by reference.

STATEMENT AS TO FEDERALLY SPONSORED RESEARCH

This invention was made with Government support under Contract/Grant No. 80NSSC18K1421, 80NSSC19K1270, and 80NM0018D004, awarded by the National Aeronautics and Space Administration (NASA) Jet Propulsion Laboratory (JPL), and G16AC00230 awarded by the United States Geological Survey (USGS). The Government has certain rights in this invention.

BACKGROUND

1. Field

This disclosure relates generally to RF communication, and more specifically, to RF synchronization for MIMO software defined radio sensor networks.

2. Description of the Related Art

Frequently, remote sensing and communication infrastructures require clock synchronization across different and distributed nodes. However, utilization of common clock references such as that provided by GPS exhibit various limitations. For instance, synchronization may be needed in a GPS-denied environment. Moreover, GPS provides inadequate precision for synchronization in various high-precision use cases. Thus, there is a need for improved clock and/or local oscillator synchronization across distributed systems.

SUMMARY

In various embodiments, a method for providing wireless clock synchronization of multiple devices is disclosed. The method may include performing coarse synchronization by synchronizing clocks of each of the multiple devices using an independent clock source. The method may also include performing fine clock synchronization. The performance of fine clock synchronization may include measuring pair-wise radio frequency (RF) time of flight using baseband waveform samples of each of the multiple devices based on the clocks of each of the multiple devices. Performing fine clock synchronization may also include applying at least one of (i) a fractional delay and (ii) a phase correction to the baseband waveform samples to cause the baseband waveform samples to replicate equivalently synchronized sample clocks.

In various embodiments of the provided method, one or more of the following aspects may also be included. For instance, the independent clock source may be a global positioning system (GPS) signal. The measuring of pair-wise radio frequency RF time of flight using baseband waveform samples may include estimating RF time of flight from a peak location of the baseband waveform samples and mutual exchange of information as encoded wireless broadcasts. In various embodiments, estimating the peak location is performed using at least one of spectral phase slope estimation, quadratic least-squares fitting, or sinc nonlinear least-squares. Moreover, the method may be implemented entirely in software. The fine clock synchronization may provide synchronization with up to 100 picosecond precision with a 50 megahertz signal bandwidth. The multiple devices may each include a sensor with an independent clock. The multiple devices may form a wireless network. Moreover, the sensor of each of the multiple devices may obtain, via the method, complete knowledge of line of sight distance between each pair of sensors to within 2 centimeters to decentralize localization of each of the multiple devices in the network. The multiple devices may include any number of devices.

In various instances, the method also includes further aspects. The method may include transmitting the baseband waveform samples after applying the at least one of the (i) fractional delay and (ii) the phase correction. The method may include transmitting, by the multiple devices, RF signals synchronized in time and phase, wherein the multiple devices act as a single coherent device.

In addition to providing a method, the disclosure herein also provides a system. A clock-synchronized wireless communication system may be provided. The system may include a plurality of portable devices. Each portable device may have a radio transceiver with a clock. Each portable device of the plurality of portable devices may perform coarse clock synchronization by synchronizing the clock with an independent clock source. At least one portable device of the plurality of portable devices performs fine clock synchronization by (i) measuring a pair-wise radio frequency (RF) time of flight between the at least one portable device and at least one further portable device of the plurality of portable devices, and (ii) applying at least one of a fractional delay and a phase correction to a baseband waveform sample to cause the baseband waveform sample to replicate an equivalently synchronized clock.

The system may include one or more of the following aspects. For instance, the independent clock source may include a GPS signal. The plurality of portable devices may form a wireless network. Each portable device of the plurality of portable devices may be an unmanned aerial vehicle of a distributed radar wireless network. The baseband waveform sample may be at least one of a radar transmission and a radar reflection of a radar target. In various instances, the radio transceiver is a time-division multiple access (TDMA) transceiver.

Furthermore, the disclosure herein provides for a portable device. The device may include a radio transceiver. The device may also include an unmanned aerial vehicle carrying the radio transceiver. The radio transceiver may include a clock. The radio transceiver is configured perform a coarse clock synchronization by synchronizing the clock with an independent clock source. The radio transceiver is also configured to perform a fine clock synchronization by (i) measuring a pair-wise radio frequency (RF) time of flight between the radio transceiver and at least one further radio transceiver of a further portable device, and (ii) applying at least one of a fractional delay and a phase correction to a baseband waveform sample to cause the baseband waveform sample to replicate an equivalently synchronized clock.

The disclosure includes other aspects related to the portable device. For instance, the independent clock source may be a GPS signal. Moreover, the radio transceiver of the portable device may transmit an RF signal synchronized in time and phase with the further portable device, wherein the portable device acts as a single coherent device with the further portable device.

BRIEF DESCRIPTION OF THE DRAWINGS

Other systems, methods, features, and advantages of the present invention will be or will become apparent to one of ordinary skill in the art upon examination of the following figures and detailed description. Additional figures are provided in the accompanying Appendix and described therein.

FIG. 4A-C illustrates a first signal exchange stage of a synchronization algorithm according to FIG. 3 for three sensors, in accordance with various embodiments;

FIG. 4D-F illustrates a second signal exchange of a synchronization algorithm according to FIG. 3 for three sensors, in accordance with various embodiments;

FIGS. 9A-C shows different wireless synchronization experimental setups at different distances, in accordance with various embodiments;

DETAILED DESCRIPTION

This disclosure presents a distributed and decentralized synchronization algorithm for wireless sensor networks (WSNs). The disclosed system and method achieves sub-nanosecond synchronization using low-cost commercial off the shelf (COTS) Universal Software Radio Peripheral (USRP) software defined radios (SDRs) and is implemented entirely in software without the need for custom hardware or atomic clocks. In an N sensor network, the proposed protocol results in each sensor having full knowledge of baseband clock offsets, RF carrier phase offsets, and pairwise RF time of flight to sub-nanosecond precision for the entire network after 2N total transmissions, making this system and method efficiently extendible to larger sensor networks. The system and method is decentralized and does not rely on an hierarchical master-slave structure, making it robust to sensor drop-out in contested or harsh environments. The proposed methodology is validated in simulation and tested in field experiments using a 3-sensor network. This system and method has a wide range of applications including transmit beam forming, distributed sensor localization and coherent multistatic/multiple-input multiple-output (MIMO) radar imaging for autonomous sensor swarms.

Clock synchronization is a key element in the operation of multi-node remote sensing and communications infrastructures. Current technologies including phased array radar and massive multiple-input multiple-output (MIMO) communications base stations rely on precise synchronization realized by distributing common clock and local oscillator (LO) references through wired connections.

The rapid increase today in small sensor technology and processing power gives rise to multi-node infrastructures without wired connections for distribution of common clock and local oscillator (LO) references. As such, systems and methods are needed to provide distributed synchronization wirelessly among physically separated nodes with independent free running clocks. For example, distributed radar sensor networks have the potential to significantly reduce cost and improve system survivability. Radar networks deployed on small autonomous unmanned platforms need wireless synchronization and are useful for a wide range of imaging applications. Bistatic and multistatic synthetic aperture radar (SAR) is of significant interest owing to numerous advantages due to the spatial separation of transmit (TX)/receive (RX) elements and also because of added system resilience by going away from a single-point failure approach of traditional monostatic systems.

MIMO SAR may be viewed as a generalized extension of bistatic and multistatic SAR systems in which all sensing nodes are capable of mutually coherent transmission and reception. Advantages of MIMO SAR systems include improved system reliability, flexibility, and capability as well as increased target reflectivity information due to spatial diversity.

Figure 1A:
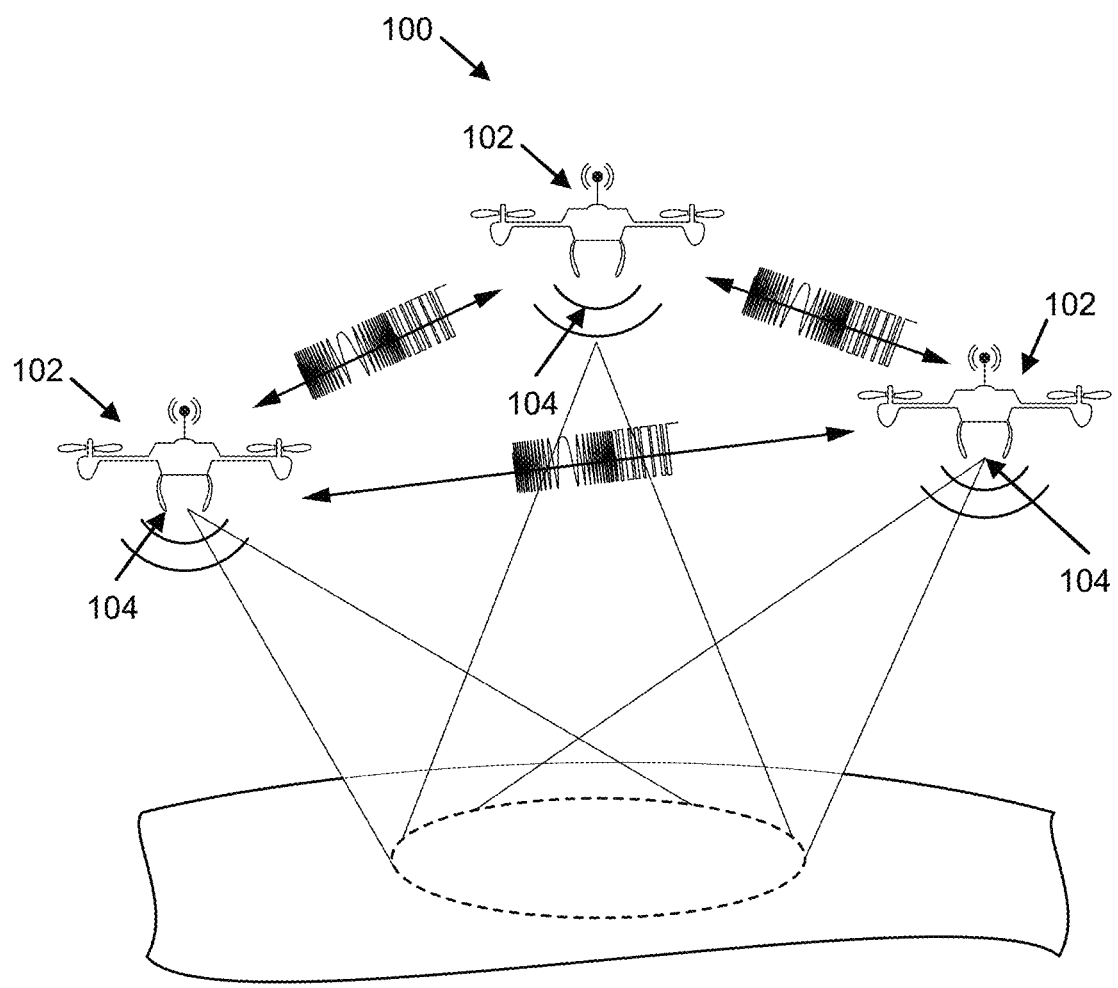
FIG. 1A depicts a system of portable devices, in accordance with various embodiments.

In various embodiments, systems and methods herein are useful for radar sensing systems similar to those shown in FIG. 1A. FIG. 1A depicts a system 100, such as a swarm, of portable devices 102, such as autonomous platforms, each having a radio transceiver 104. The radio transceiver 104 may also include a sensor or any other aspect for which synchronization is useful. For instance, the radio transceiver 104 may be a radar sensor. Swarms of small sensors on autonomous platforms may operate cooperatively to function as a single coherent sensor, and/or to perform advanced radar imaging tasks, with smaller, smarter, and lower cost sensors.

The problem of wireless multi-sensor synchronization remains among the most significant technological barriers for the realization of distributed bistatic and multistatic coherent radar systems. The synchronization problem is compounded further in the coherent MIMO radar case as all N receivers must be synchronized with all N transmitters rather than with a single transmitter as is the case with bi-static or multi-static systems.

The problem of time synchronization in general, and wireless synchronization specifically, is relevant to a wide range of distributed communications, computer networking, test and measurement, and remote sensing applications. However, prior efforts achieve precision inadequate for embodiments such as coherent radar systems. The disclosure herein provides for systems and methods to achieve precision sufficient to enable coherent radar systems.

Figure 2:
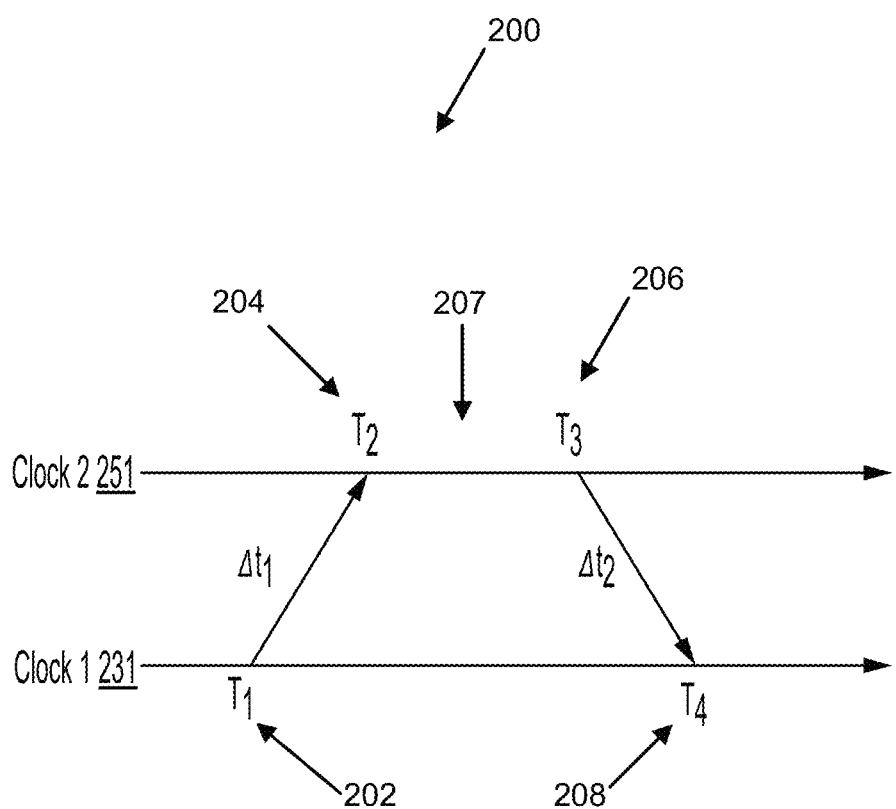
FIG. 2 depicts a timing diagram for two way time transfer (TWTT) synchronization, in accordance with various embodiments.

In one example embodiment, a similar challenge may be exhibited in the context of relativistic event simultaneity, wherein the fundamental of two way time transfer (TWTT) synchronization is relevant. FIG. 2 depicts a timing diagram 200 for TWTT synchronization. As shown in FIG. 2, a signal (or packet) is sent from an initiating source 231 at time $T_1$ 202. It is received at time $T_2$ 204 after a delay of $\Delta t_1 = T_2 - T_1$ and responded to (or reflected) by a responding source 251 after a known delay 207 at time $T_3$ 206, arriving back at the source 231 at time $T_4$ 208. The time offset of the clocks is then $((T_2-T_1)-(T_4-T_3))/2 = (\Delta t_1 - \Delta t_2)/2$ and the propagation delay is $((T_2-T_1)+(T_4-T_3))/2 = (\Delta t_1 + \Delta t_2)/2$ and the now known delay may be used to correct future time exchanges.

The concept of TWTT provides the basis for synchronization of modern systems and networks, including satellites and the internet.

1. NTP, PTP, and Other TWTT-based Methods: In large scale modern computer networks, the Network Time Protocol (NTP) and Precision Time Protocol (PTP) are ubiquitous. In NTP, timestamps are exchanged as user datagram protocol (UDP) packets to estimate round trip delay and clock offsets. NTP timestamps are generated in software with nondeterministic latencies and NTP provides synchronization accuracy of ~10 μs. PTP (IEEE-1588) improves over NTP by generating timestamps in the hardware layer. Clock alignment in PTP is achieved by sending many 'sync' packets at the expense of significant network traffic. The implementation is limited by the 125 MHz rate of the hardware timestamp counter to an accuracy of ~10 ns. The fundamental process of clock synchronization using two way time transfer is depicted in the timing diagram 200 for TWTT synchronization shown in FIG. 2.

Many prior efforts to develop synchronization protocols are extensions of the fundamental concepts used in NTP and PTP. For example, the White Rabbit protocol, developed at the European Organization for Nuclear Research (CERN), is an ethernet-based protocol that uses hardware-based Digital Dual Mixer Time Difference (DDMTD) phase detectors and specialized network switches to detect and correct fractional clock phase offsets to achieve ~10 ps accuracy across large wired networks. The common Wireless Sensor Network (WSN) synchronization solutions include reference broadcast synchronization (RBS), timing synch protocol for sensor networks (TPSN) and flooding time synch protocol (FTSP).

Both RBS and TPSN neglect signal time-of-flight over the wireless channel. As such, these methods are limited in their ability to provide precision synchronization, particularly in dynamic environments where the time-of-flight varies from node to node, and from time to time. In RBS, receiving sensors exchange time of arrival measurements for a synchronization packet sent between two reference nodes and a set of receiving sensors synchronize with one another rather than a transmitter. In pairwise broadcast synchronization (PBS), it is assumed that all nodes can 'overhear' pair-wise synchronization messages between other nodes. However, PBS requires a hierarchical node of structure. Additionally, PBS synchronization assumes that distances, e.g., signal times of flight between nodes are known a priori. These protocols generally require synchronization to be repeated multiple times in order to obtain high precision. Furthermore, these WSN synchronization protocols are designed to achieve synchronization on the order of microseconds and as such are currently unsuitable for wireless coherent radar applications.

In various instances, 150 MHz bandwidth frequency modulated continuous wave (FMCW) signals are used to achieve synchronization of 66 ps. Two stations synchronize using the 'detect' and 'respond' method found commonly in TWTT-based approaches shown in FIG. 2.

In various embodiments, the systems and methods herein provide for network synchronization in which slave nodes wait to detect the signal from the master node and then send responses in TDMA fashion. The disclosure herein provides an experimental demonstration for two nodes at far above the expected Cramer-Rao Lower Bound (CRLB).

2. Ultra-wideband Pulse Synchronization: Various embodiments of wireless synchronization systems methods are those based on ultra-wideband (UWB) pulse signals, rather than network packet exchanges. These UWB methods rely on wide bandwidth and high sample rate ADC hardware, often >1 GHz, to estimate time of arrival (TOA) at nanosecond and sub-nanosecond levels. UWB signaling is applicable to numerous synchronization models, including passive schemes with multiple receivers synchronized to a single transmitter, decentralized consensus approaches, and distributed sensor localization all using TOA estimated from high sample rate ADCs. Notably, in various instances a chip-scale atomic clock (CSAC) and 64 GHz hardware clock packet timestamp counter is used with a propagation-aware TOF protocol to distribute timing and achieve <5 ns pair-wise sensor synchronization.

However, a common misconception exists in UWB-based synchronization literature that the time resolution of TOA measurements is bounded by the ADC hardware sampling clock rate. In various embodiments, precise TOA estimation to within small fractions of a sample bin is possible, particularly in line of sight (LOS) environments, as dictated by the CRLB.

3. Synchronization using SDR: Implementations of Software Defined Radio (SDR) has seen a recent explosion due to the wide availability, low cost, and ease of development and prototyping for numerous applications. SDR hardware consists of an RF frontend and FPGA or FPGA+processor system on chip (SoC) and is capable of agile operation across wide frequency bands. Due to the software basis, SDR platforms offer unparalleled flexibility in waveform generation and signal processing operations.

Accordingly, wireless synchronization of SDR sensors is of significant value. In various embodiments, wireless synchronization is proposed for Universal Software Radio Peripheral (USRP) Software Defined Radios (SDRs). Such synchronization may address fractional clock phase estimation using a matched filter bank of 16 fractionally delayed Zudoff-Chu sequences to estimate residual timing offsets of $\frac{1}{16}$ sample duration. However, in various efforts, propagation delays not accounted for and slave nodes are synchronized to a broadcast message sent by a single master. Processing is performed in software, signal bandwidth is limited to 1 MHz, and the achieved residual timing precision is ~500 ns, far above the expected CRLB.

In some scenarios, USRP E312 embedded SDRs are used to perform timestamp-free synchronization. In various embodiments, the USRP E312 embedded SDRs attain <1 μs synchronization (0.8 μs with 125 kHz sampling rate; a precision of $\frac{1}{10}$ the sample rate). The master node waits to detect a pulse from a slave node and schedules a time-reversed transmission of the received waveform. Quadratic least-squares fitting may be used to estimate a peak of the autocorrelation signal to sub-sample resolution. However, the limited real-time correlation processing capability of an embedded USRP E312 may constrain sampling rates, such as to the low 125 kHz sampling rate or similar.

However, these approaches often require continuous real-time signal correlation to detect a pulse transmitted by a master node and rely on a software implementation of correlators. As such, these approaches are limited by the streaming bandwidth from the FPGA to processor and must use a digital down converter (DDC) to reduce the signal bandwidth from the full ADC hardware sampling rate so that continuous streaming across the FPGA processor interface is possible.

4. Multistatic and MIMO Radar: Multistatic wireless radar, wherein a single transmitter and multiple receivers operate in a coherent fashion, is often studied in relation to satellite constellations. In various embodiments of spaceborne bistatic and multistatic radar systems, solving the time and phase synchronization problem is paramount. Various approaches to multistatic radar synchronization include ultra-high-quality oscillators, such as chip scale atomic clocks (CSACs) or direct path signal based methods which require accurate positional knowledge a priori, and bidirectional link based methods.

In various embodiments, use of a dedicated synchronization link for phase synchronization and residual phase error compensation is explored for the bistatic radar case (a subset of multistatic radar with a single transmitter and a single, physically separated receiver). Such implementations use the direct path signal to perform time and phase synchronization upon signal reception. However, such implementations rely on Global Positioning System (GPS) or inertial navigation system (INS) or inertial measuring unit (IMU) data for positional knowledge and therefore the precision is limited to that of the peripheral sensors. Furthermore, it requires that the direct path signal is separable from the scattered signal of interest. This is often impossible for ground-based or low altitude UAV platforms, in particular when stepped frequency synthetic wideband techniques are necessary to obtain the requisite resolution performance.

MIMO radar is an extension of multistatic radar (single transmitter, multiple receivers), in which there are multiple transmitters and multiple receivers capable of operating coherently. Existing approaches to synchronizing MIMO radar elements includes where broadcast consensus algorithms are said to be scalable and robust for coherent MIMO radar. For instance, various instances include an UWB MIMO radar and propose a synchronization method that enables precise target localization by swapping pulses between the TX/RX elements. However, the implementation requires a central processor to synchronize the signals in post-processing. Further, the implementation relies on the ultra-wide bandwidth (500 ps pulse width or 2 GHz bandwidth) custom hardware to obtain high resolution performance, only synchronizes the elements with respect to some target, and requires that the node positions are known and fixed.

5. Synthetic Wideband Waveform Software Defined Radar: Various efforts further include demonstration of use of small embedded SDRs with FPGA+processor system on chip (SoC)-based hardware in high performance radar applications that achieve cm-level resolution. Ultra-wide bandwidths were synthesized with stepped frequency methods. In order to extend stepped frequency radar to coherent wireless MIMO systems, an agile synchronization scheme is necessary that does not require long integration times and can respond rapidly to arbitrary LO re-turnings. Furthermore, the achievable resolution is limited to the knowledge of relative positions of all sensors in the network. Therefore, the synchronization scheme must simultaneously produce precise location estimates.

Systems, devices, and methods will be discussed in great detail in the following paragraphs. However, reference to FIG. 1A for an introduction to a system, FIG. 1B for an introduction to a device, and FIGS. 1C-D for an introduction to a method is helpful before proceeding with the detailed and in depth discussion.

FIG. 1A depicts a system 100, such as a swarm, of portable devices 102, such as autonomous platforms, each having a radio transceiver 104. Radio transceiver 104 may also include a sensor or any other aspect for which synchronization is useful. For instance, the radio transceiver 104 may be a radar sensor. Swarms of small sensors on autonomous platforms may operate cooperatively to function as a single coherent sensor, and/or to perform advanced radar imaging tasks, with smaller, smarter, and lower cost sensors.

The system 100 may be a clock-synchronized wireless communication system. For instance, the different portable devices 102 may be in wireless communication among one another. There may be a need for clocks of the different portable devices 102 and/or the associated radio transceiver 104 to be synchronized. Each portable device 102 may have a radio transceiver with a clock.

The portable devices 102 may perform clock synchronization generally in two steps. As will be discussed below, the portable device 102 may perform a course clock synchronization by synchronizing the clock with an independent clock source. The independent clock source may be a GPS signal, a WWV signal, data corresponding to an independent clock source received over a communication link, or any independent clock source as desired. The portable device 102 may also perform a fine clock synchronization to even more accurately synchronize the clock with the clock of one or more other portable device 102, so that the different clocks are synchronized. For instance, the fine clock synchronization may include (i) measuring a pair-wise radio frequency (RF) time of flight between the at least one portable device 102 and at least one further portable device of a plurality of portable devices. Such synchronization may also include applying at least one of a fractional delay and a phase correction to a baseband waveform sample to cause the baseband waveform sample to replicate an equivalently synchronized clock. Details and example implementations will be provided herein.

In various instances the system 100 having portable devices 102 is a wireless network and the portable devices 102 are nodes of the wireless network. The radio transceivers 104 of the portable devices 102 may be TDMA (time division multiple access) transceivers, or any type of transceiver as desired. In further instances, the system 100 is a distributed radar network and each portable device 102 of the plurality of portable devices is an unmanned aerial vehicle of the distributed radar wireless network. In such embodiments, the baseband waveform sample(s) may be at least one of a radar transmission and a radar reflection of a radar target. For instance, multiple portable devices may be flown together to generate a large radar from many small radar devices.

Figure 1B:
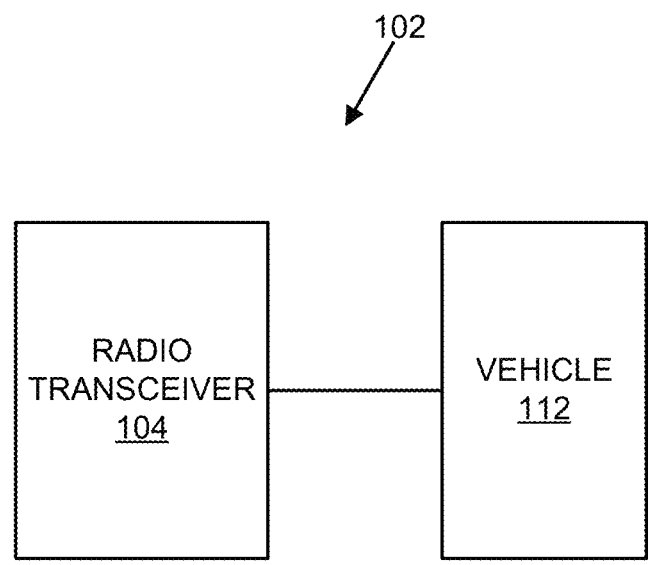
FIG. 1B depicts a portable devices, in accordance with various embodiments.

Having discussed a system according to FIG. 1A, attention is now directed to FIG. 1B to discuss an example portable device 102 of the system 100 (FIG. 1A). A portable device 102 may include a radio transceiver 104, as mentioned above. The portable device 102 may also include a platform that carries the radio transceiver 104. For example, the portable device 102 may include a vehicle 112. In various embodiments, the vehicle 112 is remotely controlled. In further instances, the vehicle 112 is autonomous. The vehicle may be land-based, such as a rover, or may be airborne, such as a drone, or may be seaborne, or may be any other vehicle as desired. In various instances, vehicle 112 is a space-based satellite or other space vehicle. The vehicle 112 may carry the radio transceiver 104 into a desired location. For instance, in various instances the radio transceiver 104 may be associated with a radar. The vehicle 112 may position the radio transceiver 104 in a location relative to other portable devices 102 and/or relative to a target. In this manner, multiple portable devices 102 may be positioned and clocks may be synchronized to operate as a single device. For instance, the system 100 (FIG. 1A) may provide a phased radar array. The radio transceiver 104 may transmit RF signals synchronized in time and phase with the radio transceivers of other portable devices 102.

Figure 1C:
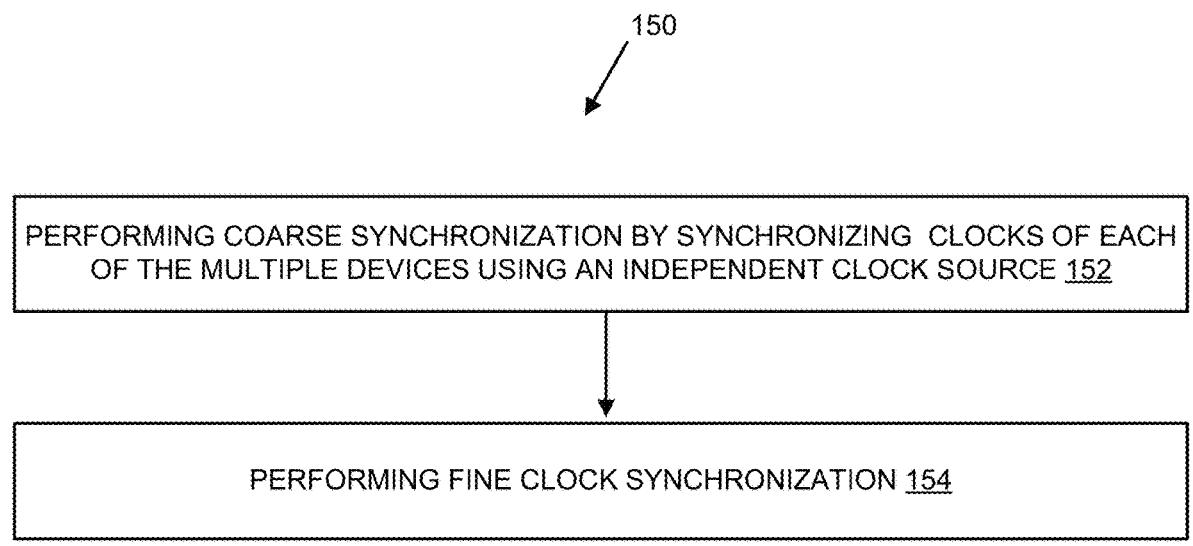
FIGS. 1C-D depict a method for providing wireless clock synchronization of multiple devices, in accordance with various embodiments.
Figure 1D:
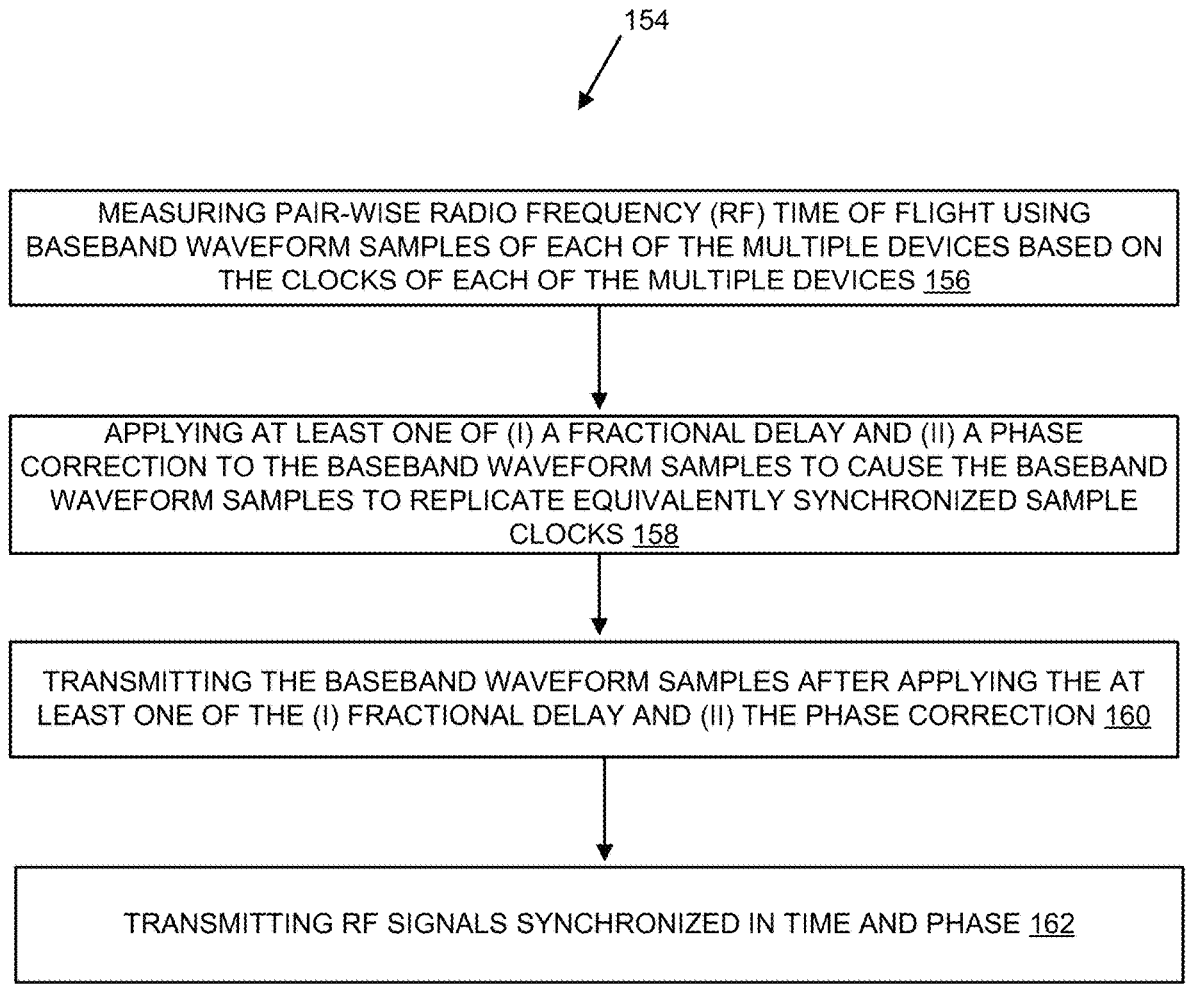

Attention is now directed to FIGS. 1C-D for a discussion of a method 150 for providing wireless clock synchronization of multiple devices. The method may include performing coarse synchronization by synchronizing clocks of each of the multiple devices using an independent clock source (block 152). Aspects of block 152 will be explained further in the sections below. The method may further include performing fine clock synchronization (block 154).

Fine clock synchronization (block 154) may include measuring pair-wise radio frequency (RF) time of flight using baseband waveform samples of each of the multiple devices based on the clocks of each of the multiple devices (block 156). Fine clock synchronization (block 154) may also include applying at least one of (i) a fractional delay and (ii) a phase correction to the baseband waveform samples to cause the baseband waveform samples to replicate equivalently synchronized sample clocks (block 158).

In various embodiments, the measuring pair-wise radio frequency RF time of flight using baseband waveform samples includes estimating RF time of flight from a peak location of the baseband waveform samples and a mutual exchange of information as encoded wireless broadcasts. Moreover, estimating the peak location may be performed using at least one of spectral phase slope estimation, quadratic least-squares fitting, or sinc nonlinear least-squares. The method may be implemented entirely in software. The fine clock synchronization may provide synchronization with up to 100 picosecond (ps) precision with a 50 MHz signal bandwidth. The multiple devices each may include a sensor with an independent clock. The multiple devices may form a wireless network. The method may provide the sensor of each of the multiple devices with complete knowledge of line of sight distance between each pair of sensors to within 2 centimeters to decentralize localization of each of the multiple devices in the network. Moreover, the multiple devices may include any number of devices.

In various embodiments, after block 156, the method continues with transmitting the baseband waveform samples after applying the at least one of the (i) fractional delay and (ii) the phase correction (block 160). In various embodiments, the method also includes transmitting RF signals synchronized in time and phase, wherein the multiple devices act as a single coherent device (block 162).

Having briefly introduced systems, devices, and methods, further discussion below explains specific aspects of the systems, devices, and methods. Given syntonized clocks, rather than correcting the sampling clocks themselves, the systems and methods achieve sub-nanosecond synchronization by applying fractional delays and phase corrections to the baseband waveform samples such that, given known sample clock characteristics, the signal at the time of transmission will be identical to that which would be produced by equivalently synchronized sample clocks. As a result, the systems and methods are able to perform both sub-nanosecond synchronization and coherent operation without the need for sub-nanosecond clock phase alignment.

Features of this synchronization system and method include at least the following. First, 100 picosecond precision with 50 MHz signal bandwidth and sample clock rate based on prior coarse synchronization to ~10 ns precision. In contrast, prior efforts have required ultra-wideband radios with 10 GHz signal bandwidth to achieve similar performance. Second, coherent transmit operation is enabled, enabling applications such as MIMO beam forming. Third, the new and fast peak estimation algorithm is executed in in O(1) (constant time). Fourth, the system and method are implementable entirely in software without the need for additional hardware phase locked loops (PLL), deterministic hardware-based signal detection algorithms, or precise chip scale atomic clocks (CSACs). By not requiring a PLL, synchronization can be performed at different RF frontend frequencies, enabling the systems and methods to be used in frequency hopping applications and synthetic wideband radars. Fifth, these systems and methods simplify hardware requirements by achieving synchronized coherent operation without needing to synchronize hardware clocks, but by characterizing clock behavior and precisely modifying digital waveform samples (e.g., baseband waveform samples) prior to sampling and transmission by the sensor with the characterized clock. Sixth, these systems and methods are efficiently extendable to N-sensor networks, with the entire network synchronized. Seventh, the systems and methods provide all sensors in the network with complete knowledge of line of sight distance between every pair of sensors, enabling decentralized localization of nodes.

Finally, these systems and methods can extended efficiently to large decentralized networks as they require only 2N transmissions and no point to point links, making it O(N). While the systems and methods exploit the same fundamental symmetry as TWTT, the sensors do not need to detect and respond to signals from one another, which would otherwise require N(N−1) total transmissions and hence be O(N²) for a decentralized network with no master node.

System Model

Assume a network of N wireless radio sensors each with an independent clock. For sensor i, the local clock may be modeled as having drift $\alpha_1$ and bias $\phi_i$ so that the local time $\tau_i$ with respect to some global reference time t is $$\tau_i = \alpha_i t + \phi_i \quad (1)$$

The relative time of a second sensor j as measured by sensor i and in the time domain of sensor i is $$\tau_i = \frac{\alpha_i}{\alpha_j}(\tau_j - \phi_j) + \phi_i \quad (2)$$

Assume that all device clocks are synchronized in frequency or syntonized via a hardware phase-locked loop (PLL) tuned to an external frequency reference source, such as a GPS pulse per second (PPS) signal. Assume also that coarse time synchronization is derived from rising edge detection of the same external PPS signal. Therefore assume that $\alpha_i = 1$ for all sensors and that $\phi_i$ changes slowly over time according to a smooth bounded random process. That is, assume that $\phi_i$ can be treated as a constant for the duration of time required to complete a single synchronization exchange cycle for the entire network; henceforth referred to as a synchronization epoch.

Assume each sensor is a radio transceiver capable of transmitting and receiving arbitrary complex baseband waveforms having bandwidth B sampled at a sampling rate $f_s$ which are up/down-converted to a tunable RF carrier frequency $f_c$ using TX/RX local oscillators (LOs) derived from the same oscillator that produces the baseband digital sampling clocks. That is, each sensor i is capable of transmitting a waveform $w_i(t)$ from a baseband complex arbitrary waveform $s_i(t)$, which may be overheard and received by all sensors in the network as a wireless broadcast. Due to generally non-deterministic LO PLL divider states when tuning to $f_c$, define RF carrier phase offset terms $\gamma_i^{tx}$ and $\gamma_i^{rx}$ due to signal mixing with the TX LO and RX LO, respectively. The waveform $w_i(\tau_i)$ generated in the clock domain of sensor i $$w_i(\tau_i) = s_i(\tau_i) e^{j2\pi f_c(\tau_i)} e^{j\gamma_i^{tx}} \quad (3)$$

is transmitted in the global clock domain as $w_i(t)$ $$w_i(t) = s_i(t+\phi_i) e^{j2\pi f_c(t+\phi_i)} e^{j\gamma_i^{tx}} \quad (4)$$

The continuous time waveform $s_i(\tau_i)$ is related to the digital sequence $s_i[n]$ by the Whittaker-Shannon interpolation for digital-to analog conversion $$s_i(\tau_i) = \sum_{n=-\infty}^{\infty} s_i[n] \operatorname{sinc}(f_s \tau_i - n) \quad (5)$$

where $$\operatorname{sinc}(x) = \frac{\sin(\pi x)}{\pi x}$$

is the normalized sinc function.

Further, assume that two nodes i and j are separated by line of sight distance $R_{i,j} = R_{j,i}$ which is related to the RF time of flight (TOF) by $$TOF_{i,j} = \frac{R_{i,j}}{c}.$$

The signal transmitted by sensor j is then received and down-converted by sensor i, with the RX LO derived from its own clock time $\tau_i$ as $r_{i,j}(t)$ $$r_{i,j}(t) = w_j\left(t - \frac{R_{i,j}}{c}\right) e^{-j2\pi f_c(t+\phi_i)} e^{-j\gamma_i^{rx}} \quad (6)$$

Note that this discussion represents the imaginary unit using the roman character j to distinguish it from the sensor index j. Define $\gamma_{i,j}^{err} = \gamma_j^{tx} - \gamma_i^{rx}$ as the cumulative phase offset error due to the RX and TX LOs of sensors i and j, respectively. Expand (6) to obtain the expression $$r_{i,j}(t) = s_j\left(t + \phi_j - \frac{R_{i,j}}{c}\right) e^{j2\pi f_c\left(-\phi_i + \phi_j - \frac{R_{i,j}}{c}\right)} e^{j\gamma_{i,j}^{err}} \quad (7)$$

and, when expressed purely in the clock domain of sensor i, (7) becomes $$r_{i,j}(\tau_i) = s_j\left(\tau_i - \left(\phi_i - \phi_j + \frac{R_{i,j}}{c}\right)\right) \cdot e^{-j2\pi f_c\left(\frac{R_{i,j}}{c} + \phi_i - \phi_j\right)} e^{j\gamma_{i,j}^{err}} \quad (8)$$

After digitization with analog-to-digital converters (ADCs) having sample rate $f_s$, the discretized signal received by sensor i is $r_{i,j}[n]$ $$r_{i,j}[n] = s_j\left[n - f_s\left(\phi_i - \phi_j + \frac{R_{i,j}}{c}\right)\right] \cdot e^{-j2\pi f_c\left(\frac{R_{i,j}}{c} + \phi_i - \phi_j\right)} e^{j\gamma_{i,j}^{err}} \quad (9)$$

Consider the continuous time signal d(t) defined as the cross-correlation of r(t) with s(t)

$$d(t)=r(t)*s*(-t) \triangleq (r*s)(t) \tag{10}$$

$$D(f)=R(f)S*(f) \tag{11}$$

where the * operator indicates convolution. S(f), R(f), and D(f) are the Fourier transforms (FTs) of s(t), r(t), and d(t) respectively, defined for D(f) as $$D(f)=\int_{-\infty}^{\infty} d(t)e^{-j2\pi ft}dt \tag{12}$$

For $d_{i,j}(t)$, define $$d_{i,j}(\tau_i) = r_{i,j}(\tau_i) * s_j^*(-\tau_i) \tag{14}$$
$$= \left((s_j * s_j)\left(\tau_i - \left(\phi_i - \phi_j + \frac{R_{i,j}}{c}\right)\right)\right) \cdot$$
$$\left(e^{-j2\pi f_c\left(\frac{R_{i,j}}{c}+\phi_i-\phi_j\right)} e^{i\gamma_{i,j}^{err}}\right)$$

where * denotes cross-correlation as defined in (10). The magnitude of the cross-correlation signal $d_{i,j}(\tau_i)$ has a global maximum at:

$$t_{pk:i,j} = \mathrm{argmax}_{\tau_i} |d_{i,j}(\tau_i)| \tag{15}$$

$$= \phi_i - \phi_j + TOF_{i,j} \tag{16}$$

at which point the phase is $$<d_{i,j}(t_{pk:i,j})=\gamma_{i,j}^{err}-2\pi f_c(\phi_i-\phi_j+TOF_{i,j}) \tag{17}$$

The discussion arrives at a similar expression for the discrete time cross-correlation $d_{i,j}[n]$ of the sampled signals $r_{i,j}[n]$ and $s_j[n]$, where the fractional peak index $n_{pk:i,j}$ is related to the peak time as $$n_{pk:i,j}=f_s \cdot t_{pk:i,j} \tag{18}$$

There is a common misconception that the time resolution of the cross-correlation peak is limited by the sampling rate, and that the sampling clock rate is the limiting factor in how precisely signal arrival time can be measured. However, this is not the case as discrete time signals sampled according to the Nyquist sampling rate contain all information present in their continuous time counterparts. That is to say that estimation of discrete autocorrelation peak location $t_{pk:i,j}$ for a single target is possible at timing resolution that is orders of magnitude beyond the width of a sample clock bin.

Syntonization and Course Synchronization

With reference to FIG. 1C, a method 100 may include a course synchronization of device clocks (block 152). Stated differently, the method 100 may include syntonization of device clocks. For instance, prior to performing synchronization, all device clocks are synchronized in frequency or syntonized. This can be achieved with a phase locked loop (PLL) that is locked to a pulse per second (PPS) signal. Because the device clock will oscillate many times during the period of a single PPS signal, a PLL, digital control loop, and voltage controlled crystal oscillator (VCXO) may be used to create highly stable frequency reference clock from a PPS signal. This type of coarse synchronization of timestamps is achieved to within a few clock cycles by rising edge detection of the same PPS reference.

In this discussion, one may assume the PPS for coarse synchronization can be obtained from a GPS receiver (e.g., independent clock source) in a GPS-enabled environment. Generally, the accuracy of GPS PPS signals for commodity GPS receivers is on the order of ~10 ns with respect to Coordinated Universal Time (UTC). Thus, coarse synchronization of timestamps to ~10 ns is possible by edge detection of a GPS PPS reference.

In order for the method described herein operate as desired, the coarse synchronization must be (i) accurate enough such that the master controller, which instructs the sensor network to commence operation, is time synchronized to the sensor network to within 1 s of UTC and (ii) precise enough for the receive windows of all sensors in the network to be sufficiently aligned such that they are guaranteed to contain only the signal sent by the transmitting sensor(s) as determined by the scheduling and orthogonality schemes of the network (e.g., within 100 μs for a TDMA time slot allocation of the same size).

For GPS-denied environments, syntonization and coarse synchronization must be derived from another source. One solution is a master reference source (e.g., independent clock source) that distributes a PPS signal as a P/N sequence. Each receiver has a 1-bit correlator that detects this master signal and generates a local PPS from which a timing reference can be derived and used for syntonization and coarse synchronization. A 'propagation-aware' approach is necessary for accurate coarse time synchronization. In general, coarse synchronization is achieved by an independent system, of which many exist.

Fine Synchronization

With reference to FIG. 1C a method 100 may include fine synchronization of device clocks (block 154). For instance, based on the previously stated assumptions of syntonization and coarse synchronization, one may derive a decentralized method for fine synchronization. Thus the block 154 may include further steps therein. The decentralized method for fine synchronization of wireless sensor nodes in an N-sensor network may include synchronization to nearly $\frac{1}{1000}^{th}$ of the sampling clock rate.

Assuming that coarse clock synchronization (~10 ns) and frequency syntonization can be achieved using above described methods such as GPS or other mechanisms above described, this work proceeds based on two key insights:

First, if two radios with random time-varying relative clock offsets transmit to one another simultaneously (according to their own clock), the local delay measured (block 156) in each is symmetric about the true delay. The average of the two local delay measurements is the minimum variance estimate of the true delay. This approach does not require hardware-based signal detection and response in deterministic time to measure TOF delay. This has been shown to apply for integer clock cycles, and holds for fractional clock cycles (clock phase) as well.

Second, if sampling clocks are characterized sufficiently, modifying the baseband digital waveform (block 158) prior to transmission can result in a transmitted signal that is equivalent to that produced by coherent synchronized clocks. This means that in pulsed applications, e.g., radar, effective coherent synchronization may be achieved without synchronization of hardware clocks.

In various embodiments, a time-division multiple access (TDMA) scheme is implemented. However, other orthogonality schemes such as code division multiple access (CDMA) or combined TDMA/CDMA can also be used. For a given TDMA TX slot, because the TDMA schedule is known to all sensors in the network, the local integer clock timestamp of any transmitting sensor when a given pulse is sent will be known across the network.

Figure 3:
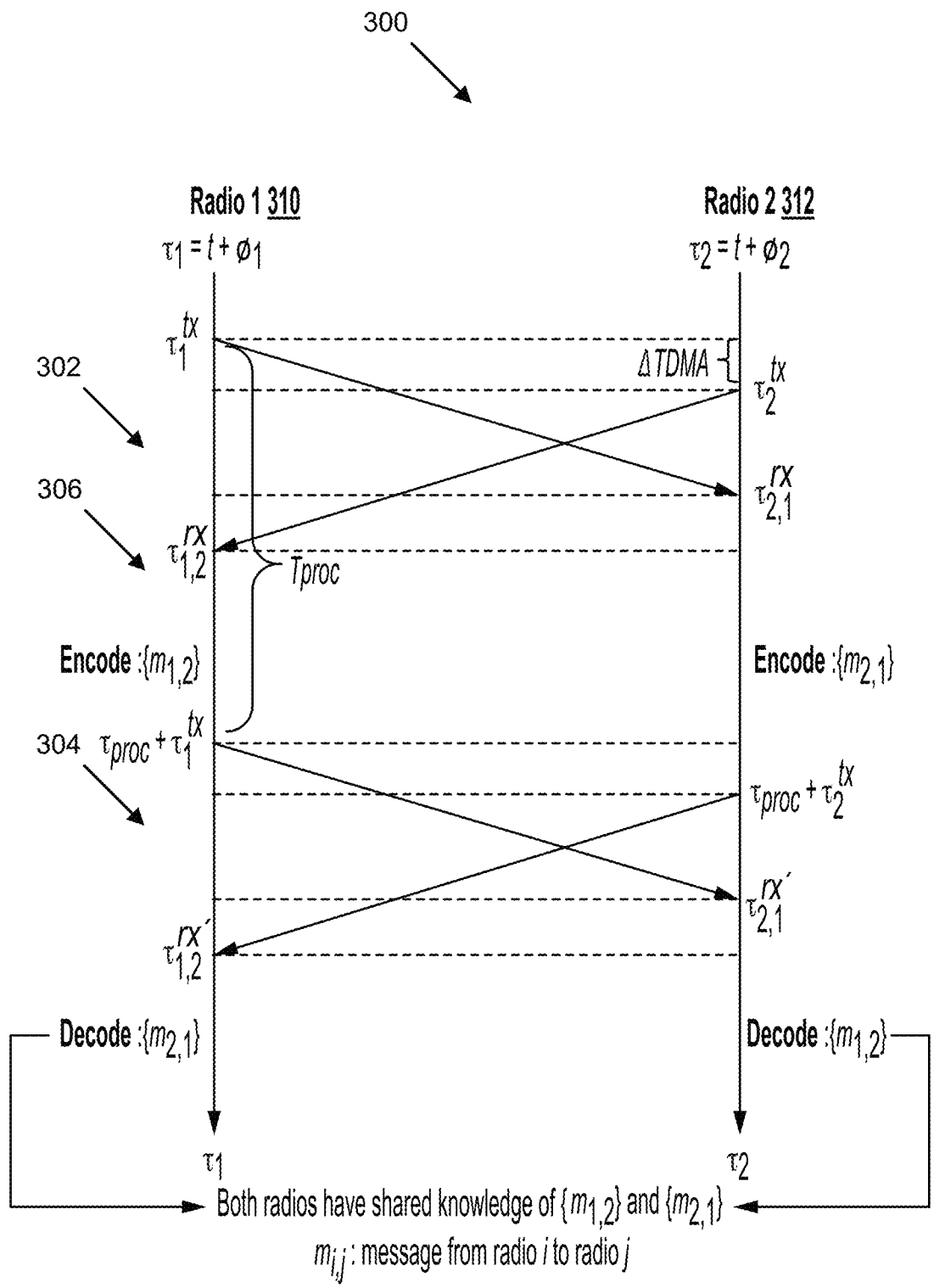
FIG. 3 depicts aspects of a synchronization algorithm, in accordance with various embodiments.

A. N-Sensor Synchronization Exchange: Assume that a wireless network of N sensors have syntonized oscillators and that their timestamps are coarsely synchronized to within a single integer clock cycle of a global reference, and one another. The remaining clock offset for sensor i relative to some global reference is due to a clock phase term $\phi_i$, which represents a fractional clock offset. With reference to FIG. 3, define the synchronization epoch as the period during which a single iteration of the synchronization algorithm 300 is performed for the two sensor case. Assume that $\phi_i$ is constant over the two way synchronization epoch, but varies randomly over larger time scales. Furthermore, assume that the relationship between the local clock of sensor i, $\tau_i$ and some globally 'true' time t may be expressed as $t=\tau_i$.

Denote $TOF_{i,j}$ as a free-space signal time of flight between two sensors i and j due to a physical separation of $TOF_{i,j} \cdot c$ where c is the speed of light. Transmissions are performed according to a known TDMA scheme starting at time $\tau_1^{tx}$ with time slot size $\Delta_{TDMA}$ where each sensor transmits at time $\tau_i^{tx}=\tau_1^{tx}+(i-1)\Delta_{TDMA}$ according to its local clock.

Define $\tau_{i,j}^{rx}$ as the time that sensor i receives the signal transmitted by sensor j relative to its own clock $$\tau_{i,j hu\ rx}=TOF_{i,j}+(j-1)\Delta_{TDMA}\phi_i-\phi_j \quad (19)$$

This is shown for the two sensor case in FIG. 3 as the first signal exchange 302. For illustrative purposes, $\Delta_{TDMA}$ is depicted as being <TOF in this diagram. However, in practice $\Delta_{TDMA}$ should be chosen to be >TOF for wireless channels so as to avoid signal interference. Note, however, that from the wireless sensors point of view, these transmissions can be considered to occur simultaneously.

Define $m_{i,j}$ as the encoded message containing sensor i's measurement of $\tau_{i,j}^{rx}$ after subtraction of the known TDMA time slot offset $$m_{i,j}=TOF_{i,j}+\phi_i-\phi_j \quad (20)$$

A second round of signal transmissions 304 are performed after a known processing time offset $\tau_{proc}$ 306 according to the same TDMA scheme used for the first exchange. Sensors 310, 312 transmit a second pulse with all messages $\{m_{i,k}|k \neq i\}$ appended at local time $\tau_i^{tx'}=\tau_{proc}+\tau_1^{tx}(i-1)\Delta_{TDMA}$. Define $\tau_{i,j}^{rx'}$ as the time relative to its own clock that sensor i receives a second signal transmitted by sensor j containing both the synchronization waveform (FIG. 1D, block 160) and the set of messages $\{m_{i,j}|k \neq j\}$ which includes message $m_{j,i}$ $$\tau_{i,j}^{rx'}=\tau_{proc}+TOF_{i,j}+(j-1)\Delta_{TDMA}\phi_i-\phi_j \quad (21)$$

This is shown as the second signal exchange 304 in FIG. 3 for the two sensor case.

Each of the N sensors now estimates the N×N matrix of synchronized time of flight measurements from the shared messages as TOF, which is symmetric with zeroes along the diagonal.

$$T\hat{O}F_{i,j}=\frac{m_{i,j}+m_{j,i}}{2} \quad (22)$$

Similarly, the relative estimated clock phase offsets between sensor i and j are represented as an N×N matrix $\hat{\Phi}$.

$$\hat{\Phi}_{i,j}=\frac{m_{i,j}-m_{j,i}}{2} \quad (23)$$

$$=\phi_i-\phi_j \quad (24)$$

Note that equations 19-22, if reduced to the N=2 case, are similar to the sensor expressions and exploit the same fundamental concepts of TWTT.

The synchronization process is illustrated for three sensors in FIG. 4A-C for the first signal exchange stage 302 (FIG. 3) and in FIG. 4D-F for the second signal exchange stage 304 (FIG. 3). FIG. 4A shows a signal exchange for a first TDMA time slot 401 for the first signal exchange stage 302 (FIG. 3). FIG. 4B shows a signal exchange for a second TDMA time slot 403 for the first signal exchange stage 302 (FIG. 3). FIG. 4C shows a signal exchange for a third TDMA time slot 405 for the first signal exchange stage 302 (FIG. 3). FIG. 4D shows a signal exchange for a first TDMA time slot 407 for the second signal exchange stage 304 (FIG. 3). FIG. 4E shows a signal exchange for a second TDMA time slot 409 for the second signal exchange stage 304 (FIG. 3). FIG. 4F shows a signal exchange for a third TDMA time slot 411 for the second signal exchange stage 304 (FIG. 3).

B. Clock Compensation and Transmit Synchronization: Following the completion of the synchronization epoch, each sensor now transmits a waveform, again using an arbitrary orthogonality scheme. When a signal crosses to/from the clock domain of a given sensor, the time error of the sampling clock and phase error of the mixing LO are imprinted on the signal. From the estimates of the matrices TOF and $\Phi$, which are now known identically across the network, terms are derived for each sensor that estimate and correct its relative clock and RF carrier phase errors prior to transmission, synchronizing all signals in the air; and then again upon reception, synchronizing all signals in each sensor's respective local clock domain.

In various embodiments, the system and method may now align the transmit waveforms to the mean clock phase offset in the network. The fractional delay shift applied to the baseband waveform of sensor i prior to transmission is $\hat{\phi}_i$ $$\hat{\phi}_i=\frac{1}{N}\sum_j \hat{\Phi}_{i,j} \quad (25)$$

$$=\phi_i-\frac{1}{N}\sum_j \phi_j \quad (26)$$

Note that transmit waveforms could also be phase aligned to a selected reference sensor rather than the network mean. For example, systems and methods may synchronize to sensor 1 by replacing the expression in (25) with $\hat{\phi}_i=\hat{\phi}_{i,1}$. For transmit coherence, the waveform is fractionally delayed by $\hat{\phi}_i$ such that the updated local transmission time, denoted as $\hat{\tau}_i^{tx}$ for sensor i is $$\hat{\tau}_i^{tx}=\tau_i^{tx}+\hat{\phi}_i \quad (27)$$

Due to up-mixing with the LO generated from the now characterized baseband clock, the sample clock-dependent RF phase error (as described in (4)) is pre-compensated by applying a carrier phase correction term of $$e^{-j2\pi f_c \hat{\phi}_i} \quad (28)$$

to the now time-delayed waveform prior to transmit.

After shifting to the new local transmission times, the true transmission time of each waveform sent by sensor i can be written as $$t_i^{tx} = \tilde{t}_i^{tx} - \phi_i \quad (29)$$

$$= \tau_i^{tx} - \frac{1}{N}\sum_j \phi_j \quad (30)$$

Thus all effects of each individual sample clock are removed and signals are transmitted synchronously and coherently in the air (FIG. 1D, block 162).

Now the signal sent by sensor j arrives at sensor i at true time $t_{i,j}^{rx}$ $$t_{i,j}^{rx} = t_j^{tx} + \text{TOF}_{i,j} \quad (31)$$

and is received by sensor i at time $\tau_{i,j}^{rx}$ as measured by its own clock $$\tau_{i,j}^{rx} = t_{i,j}^{rx} + \phi_i \quad (32)$$

$$= \tau_j^{tx} - \frac{1}{N}\sum_{j'} \phi_{j'} + \text{TOF}_{i,j} + \phi_i \quad (33)$$

Noting that $$\grave{\phi}_i = \phi_i - \frac{1}{N}\Sigma_{j'}\phi_{j'},$$

this becomes $$\tau_{i,j}^{rx} = \tau_j^{tx} + \text{TOF}_{i,j} + \grave{\phi}_i \quad (34)$$

By adding a fractional delay to the received waveform of $-\grave{\phi}_i$, each sensor will also now coherently receive the coherently transmitted waveforms relative to their own clocks at time $\grave{\tau}_{i,j}^{rx}$.

$$\grave{\tau}_{i,j}^{rx} = \tau_{i,j}^{rx} - \grave{\phi}_i \quad (35)$$

$$= \tau_j^{tx} + \text{TOF}_{i,j} \quad (36)$$

Again, due to down-mixing with the LO generated from the receiving baseband clock, the sample clock-dependent RF phase error (as described in (6)) is corrected by applying a carrier phase correction term of $$e^{j2\pi f_c \grave{\phi}_i} \quad (37)$$

to all waveforms received by sensor i.

The effects of each sensor's random clock phase are removed in both the global time domain upon transmission as well as in each sensor's local clock domain upon reception. Thus both transmitted and received signals are synchronized in time for all sensors in the wireless network. Furthermore, the sample clock-dependent LO RF phases are removed so that the phase relationships between all sensors are stable.

Thus, by applying the described clock and carrier phase corrections the signals transmitted (and received) by the network of sensors become indistinguishable from those that would have resulted if all sensor clocks were physically connected and locked to a distributed common reference, and the network operating according to the systems and methods provided herein may therefore be considered to be synchronized.

C. RF Carrier Phase Synchronization: Due the generally non-coherent carrier phase relationships between the RF frontends of multiple disparate radios, achieving true coherent operation requires that an additional constant non-clock dependent carrier phase offset of each radio in the network be estimated and corrected. For a signal sent by radio j to radio i, denote the residual carrier phase offset error as $\gamma_{i,j}^{err}$. Assume that this phase can be modeled as a linear combination of the transmitting local oscillator (LO) phase, $\gamma_j^{tx}$ and receiving LO phase $\gamma_i^{rx}$, so that $$\gamma_{i,j}^{err} = \gamma_j^{tx} - \gamma_i^{rx} \quad (38)$$

Note that in general for SDR boards, $\gamma_i^{tx}$ and $\gamma_i^{rx}$ cannot be assumed to be equal.

Using the synchronized time of flights in the network computed from (22), the relative clock offsets computed from (23), and based on the signal model in (17), estimate the residual uncompensated RF carrier phase error $\gamma_{i,j}^{err}$ as $$\gamma_{i,j}^{err} = \sphericalangle d_{i,j}[n_{pk}] + 2\pi f_c(\text{TÒF}_{i,j} + \grave{\phi}_{i,j}) \quad (39)$$

where $\sphericalangle(\cdot)$ denotes the phase of a complex number. Because there are $N^2$ measurements $\gamma_{i,j}^{err}$ with only 2N unknowns $\gamma_i^{tx}$ and $\gamma_i^{rx}$, solutions maybe found to the transmit and receive carrier phase errors for $N \geq 2$. If each sensor is unable to perform a measurement of its own total LO phase offset, e.g., by receiving its own transmitted signal, then the number of equations reduces to $N^2-N$. Thus carrier phase error estimation is still possible if $N \geq 3$. In either case, for the resulting linear system matrix to be full column rank, the transmit channel of one sensor must be chosen as the carrier phase zero-reference, i.e., $\gamma_1^{tx}=0$. After solving for the residual transmit and receive phase errors, each sensor i may apply a conjugated phase correction term of $-\gamma_i^{tx}$ to its transmit waveform and of $-\gamma_i^{rx}$ to all received waveforms.

The regularity with which carrier phase synchronization must be performed depends on both the transceiver characteristics and operating mode. For example, in the AD9361 RFIC used in one example embodiment, and in many commercial SDR boards, the LO phase offset changes non-deterministically each time the LO is retuned. Thus for frequency hopping applications, carrier phase resynchronization may be required after each frequency change. However for single frequency applications, performing carrier phase synchronization once as an initial calibration may be sufficient.

Peak Detection

The performance of the proposed synchronization algorithm depends on the precision with which time delay can be estimated from a sampled received signal. For a length L discrete complex baseband reference waveform s[n], and the signal transmitted by one radio and received and sampled by another r[n], the time delay is computed from the crosscorrelation of s[n] and r[n]. This is the sequence d[n] given by $$d[n] = r[n] \circledast s^*[-n] \Leftrightarrow \text{DFT } D[k] = R[k]S^*[k] \quad (40)$$

where the $\circledast$ operator indicates circular convolution. S[k], R[k], and D[k] are the discrete Fourier transforms (DFTs) of s[n], r[n], and d[n] respectively, defined for D[k] as $$D[k] = \sum_{n=0}^{L-1} d[n]e^{-j2\pi nk/N} \quad (41)$$

A number of methods exist for estimation of autocorrelation true peak location to sub-sample precision, including interpolation and slope estimation of the spectral phase. In practice, interpolation is an inefficient approach as the accuracy of the estimated peak location is directly dependent on the upsampling factor. In order to obtain picosecond-level precision from a signal sampled at 50 MHz, interpolation by a factor of 20,000 would be required. For a length of 2048 sample sequence, this is not feasible.

In this section, we examine three methods for estimating the true sub-sample peak location of the correlation sequence: spectral phase slope estimation, quadratic least-squares (LS) fitting, and a new sine nonlinear least-squares (NL-LS) algorithm. Simulated results are compared with the Cramer-Rao bound for one-way TOF.

A. Cramer-Rao Lower Bound: Consider below the established Cramer-Rao lower bound (CRLB) for one-way TOF measurements in noisy environments with pulse compression. The CRLB minimum variance one-way TOF measurement $\sigma_{TOF}^2$ for a single pulse nonanalytic complex signal (LFM chirp with rect window) is $$\sigma_{TOF}^2 \geq \frac{3}{2(\pi \cdot B)^2 \cdot SNR \cdot T_p \cdot f_s} \quad (42)$$

Figure 5A:
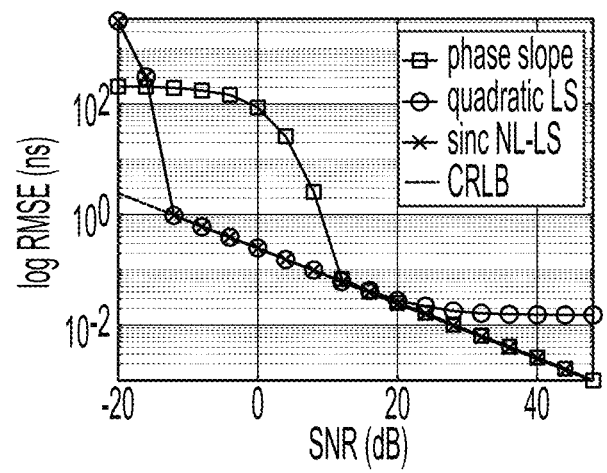
FIG. 5A illustrates a performance comparison of cross-correlation fractional peak estimation methods for a linear frequency modulated (LFM) chirp, in accordance with various embodiments.
Figure 5B:
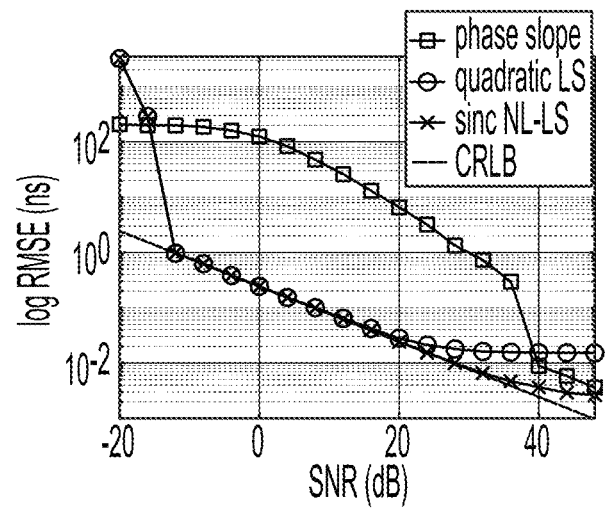
FIG. 5B illustrates a performance comparison of cross-correlation fractional peak estimation methods for a pseudorandom noise (P/N) code, in accordance with various embodiments.

The CRLB as stated in (42) is shown in FIGS. 5A-B. FIG. 5A illustrates for a LFM chirp 501 a performance comparison of cross-correlation fractional peak estimation methods versus SNR. FIG. 5B illustrates for a P/N code 503 a performance comparison of cross-correlation fractional peak estimation methods versus SNR. In both FIGS. 5A-B, a pulse length N=1024 and sampling rate is 50 MHz used in both simulations (Time-bandwidth product (T×BW)=1024). On average, sine NL-LS estimation converges in <4 iterations and is limited to a maximum of 5 iterations. The radar time delay TOF CRLB given in (42) is shown for comparison. A derivation of (42) is given in the final section of the disclosure further below. Moreover, note that the discussion herein uses critically sampled waveforms such that B=$f_s$.

B. Spectral Phase Slope: Shifting of a time domain sequence appears as a linear phase term in its Fourier transform. Thus a fractional delay in a discrete time signal can be retrieved via linear LS estimation of the spectral phase slope. Using the fundamental properties of the Fourier transform, spectral linear phase slope estimation is done as follows: first compute the DFT of d[n], D[k], and take the spectral phase term $\theta[k]=\angle D[k]$ over the sequence of frequencies in the $$DFTf[k] = \frac{f_s}{L}\left(k - \frac{L}{2}\right).$$

Compute the linear LS slope estimate of the spectral phase $\beta$ as:

$$\beta = \frac{L\langle f, \theta \rangle - \langle f, 1 \rangle \cdot \langle \theta, 1 \rangle}{L\langle f, f \rangle - \langle f, 1 \rangle \cdot \langle f, 1 \rangle} \quad (43)$$

where (•,•) denotes the scalar inner product, and 1 is the unity vector. The sub-sample true peak estimate $\hat{t}_{pk}$ is then $$\hat{t}_{pk} = -\frac{\beta}{2\pi} \quad (44)$$

Spectral phase slope estimation is sensitive to noise and performs comparatively poorly in cases where SNR is low as seen in FIG. 5. This is because this method does not take advantage of the matched filter gain which is only realized in the time domain.

The performance of this method can be improved for low SNR signals by applying a window function centered around the integer peak index $n_{pk}$ of the autocorrelation signal before taking the DFT. For a general window function h[n] of size $2L_w+1$, define an amplitude weighting function a[n]

$$a[n] = \begin{cases} h[n - n_{pk}], & n \in \{n_{pk} - L_w, n_{pk} + L_w\} \\ 0, & \text{otherwise} \end{cases} \quad (45)$$

$$D[k] = \sum_{n=0}^{L-1} a[n]d[n]e^{-j2\pi nk/L} \quad (46)$$

This is analogous to a bandpass filter and effectively acts to reduces the spectral noise by filtering it in the time domain. In order to preserve the amplitude structure of the autocorrelation signal, a flat top window such as a rectangular or tapered cosine (Tukey) should be chosen. This is because the window as defined in (45) is in general not centered around the true peak of the autocorrelation signal, and, as a result, a non-flat top window top window will introduce bias errors in the true peak estimate.

C. Quadratic Least-Squares: The approach of modeling the autocorrelation peak as a quadratic may also be used widely. The peak location is estimated using just the three surrounding points, making this estimation algorithm O(1). Because it is imperative that the complete synchronization process execute with as little latency as possible, peak estimation algorithms that execute in constant time are desirable.

Using this approach, it may be found that the maximum peak index $n_{pk}$ of the matched filter output is $$n_{pk} = \operatorname{argmax}_n |d[n]| \quad (47)$$

Using the length-three sample sequence centered about the peak to form the column vector y, where $$y: y_i = \log_{10}(|d[n_{pk}-1+i]|) i \in \{0,2\} \quad (48)$$

Perform quadratic least squares (LS) estimation and differentiate the LS quadratic polynomial to obtain a subsample rate estimate of the true peak location $\hat{n}_{pk}$.

$$\hat{n}_{pk} = n_{pk} - \frac{y_2 - y_0}{2y_0 - 4y_1 + 2y_2} \quad (49)$$

For sample rate $f_s$ the time of the true peak estimate $\hat{t}_{pk}$ is given by $$\hat{t}_{pk} = \frac{\hat{n}_{pk}}{f_s} \quad (50)$$

At high SNR, quadratic LS peak estimation suffers from bias that appears as an error that exhibits sinusoidal behavior as a function of fractional waveform delay between integer clock cycles, as seen in FIG. 5A-B. Performing upsampling and interpolation by a small integer factor prior to quadratic LS peak estimation is a viable method of reducing this bias error floor to a desired level at the cost of algorithmic efficiency. Interpolation may, for example, be performed by zero-padding the DFT, thus increasing the size requirement of the inverse DFT by an integer factor.

Note that for high SNR and noiseless signals, spectral slope estimation achieves higher precision than the quadratic LS method as is illustrated in FIGS. 5A-B. However, the tradeoff in algorithmic complexity and performance in realistic signal environments ultimately make quadratic LS peak estimation preferable in practice for many embodiments.

D. Sinc Nonlinear Least-Squares: NL-LS estimation may be used for peak fitting and estimation. In various instances, NL-LS is used with a hyperbolic and Gaussian functions for peak estimation and tracking for time of arrival (TOA) signals. Note that the peak estimate obtained by NL-LS fitting with a Gaussian function is identical to that obtained by quadratic LS estimation of the logarithm of the matched filter output. This result is known as Caruanas algorithm and is due to the quadratic form of the exponential term in the Gaussian function.

In this discussion, a sinc function kernel is used to estimate the autocorrelation peak for pulse compression waveforms using nonlinear least squares (NL-LS). This peak estimation performs well in low-SNR and avoids the biases seen in quadratic least squares estimation. As with the quadratic LS algorithm, only three sample points are used, making this algorithm O(1). Next, this disclosure provides a derivation of the sinc-based NL-LS estimation algorithm.

Given a known function $f(x; \lambda)$ that depends on input column vector x as well as parameters in the vector $\lambda$ and produces a column vector output y having the same dimensions as x, estimate parameter values that minimize the residual error.

$$f(x;\lambda) = \lambda_0 \operatorname{sinc}((x-\lambda_1)\lambda_2) \quad (51)$$

$$y: y_i = |d[n_{pk}-1+i]| i \in \{0,2\} \quad (52)$$

$$x = [-1\ 0\ 1]^T \quad (53)$$

$$\lambda = [\lambda_0\ \lambda_1\ \lambda_2]^T \quad (54)$$

Setup a cost function to minimize the residual error $$S = \sum_{i=0}^{2} (y_i - f(x_i, \lambda))^2 \quad (55)$$

To solve this, use Gauss-Newton optimization, which needs the gradients with respect to the model parameters $$\frac{\partial f(x;\lambda)}{\partial \lambda_0} = \operatorname{sinc}(\lambda_2(x-\lambda_1)) \quad (56)$$

$$\frac{\partial f(x;\lambda)}{\partial \lambda_1} = \frac{\lambda_0[\operatorname{sinc}(\lambda_2(x-\lambda_1)) - \cos(\pi\lambda_2(x-\lambda_1))]}{x-\lambda_1} \quad (57)$$

$$\frac{\partial f(x;\lambda)}{\partial \lambda_2} = \frac{\lambda_0[\cos(\pi\lambda_2(x-\lambda_1)) - \operatorname{sinc}(\lambda_2(x-\lambda_1))]}{\lambda_2} \quad (58)$$

Initialize $\lambda_0 = |d[n_{pk}]|$, $\lambda_1 = 0$, and $$\lambda_2 = \frac{B}{fs}.$$

Now, nonlinear least squares fitting is performed iteratively. At the $m^{th}$ iteration, the matrix Jacobian J and residual error $\Delta y$ are computed $$J = \left[ \frac{\partial f(x;\lambda_m)}{\partial \lambda_0}\ \frac{\partial f(x;\lambda_m)}{\partial \lambda_1}\ \frac{\partial f(x;\lambda_m)}{\partial \lambda_2} \right] \quad (59)$$

$$\Delta y = y - f(x; \lambda_m) \quad (60)$$

The matrix equation must then be solved for $\Delta\lambda$ $$J\Delta\lambda = \Delta y \quad (61)$$

Note that for estimation from three sample points, this is a square matrix and this matrix equation may be solved directly. If more sample points are used, the system is over-determined and instead systems and methods may use the normal equation solution:

$$\Delta\lambda = (J^T J)^{-1} J^T \Delta y \quad (62)$$

Once $\Delta\lambda$ is found, the parameters estimates are updated for each iteration m as $$\lambda_{m+1} = \lambda_m + \Delta\lambda \quad (63)$$

After the final iteration, obtain the estimated parameters $\lambda$ and the true peak estimate is given by $$\hat{n}_{pk} = n_{pk} + \hat{\lambda}_1 \quad (64)$$

$$\hat{t}_{pk} = \frac{\hat{n}_{pk}}{f_s} \quad (65)$$

which includes $\lambda_1$ as the offset term as it corresponds to a shift in the model sinc function stated in (51).

Because the system and method is able to provide initial peak time values that are close to the true values, the convergence of the algorithm is rapid, usually occurring in <4 iterations in practice. In general, this method performs well with only three sample points.

While the sinc NL-LS is slightly more computationally intensive than quadratic least squares, the performance improvements are significant as will be shown next. In addition, the three sample sinc NL-LS algorithm is O(1).

E. TOF Peak Estimation Algorithm Performance: Performance of each algorithm as a function of SNR is shown in FIGS. 5A-B for two types of waveforms: a linear frequency modulated (LFM) chirp 501 in FIG. 5A and a pseudorandom noise (P/N) sequence 503 in FIG. 5B. In both cases, the proposed sinc NLLS algorithm performs as well as quadratic LS for low SNR. For high SNR, sinc NL-LS significantly outperforms quadratic LS and matches the performance of spectral phase slope estimation. Simulated results show that the sinc NL-LS algorithm performance achieves the CRLB for SNR∈[−15,40] dB for both waveforms.

Processing and Exchange of Information Protocol

Figure 6:
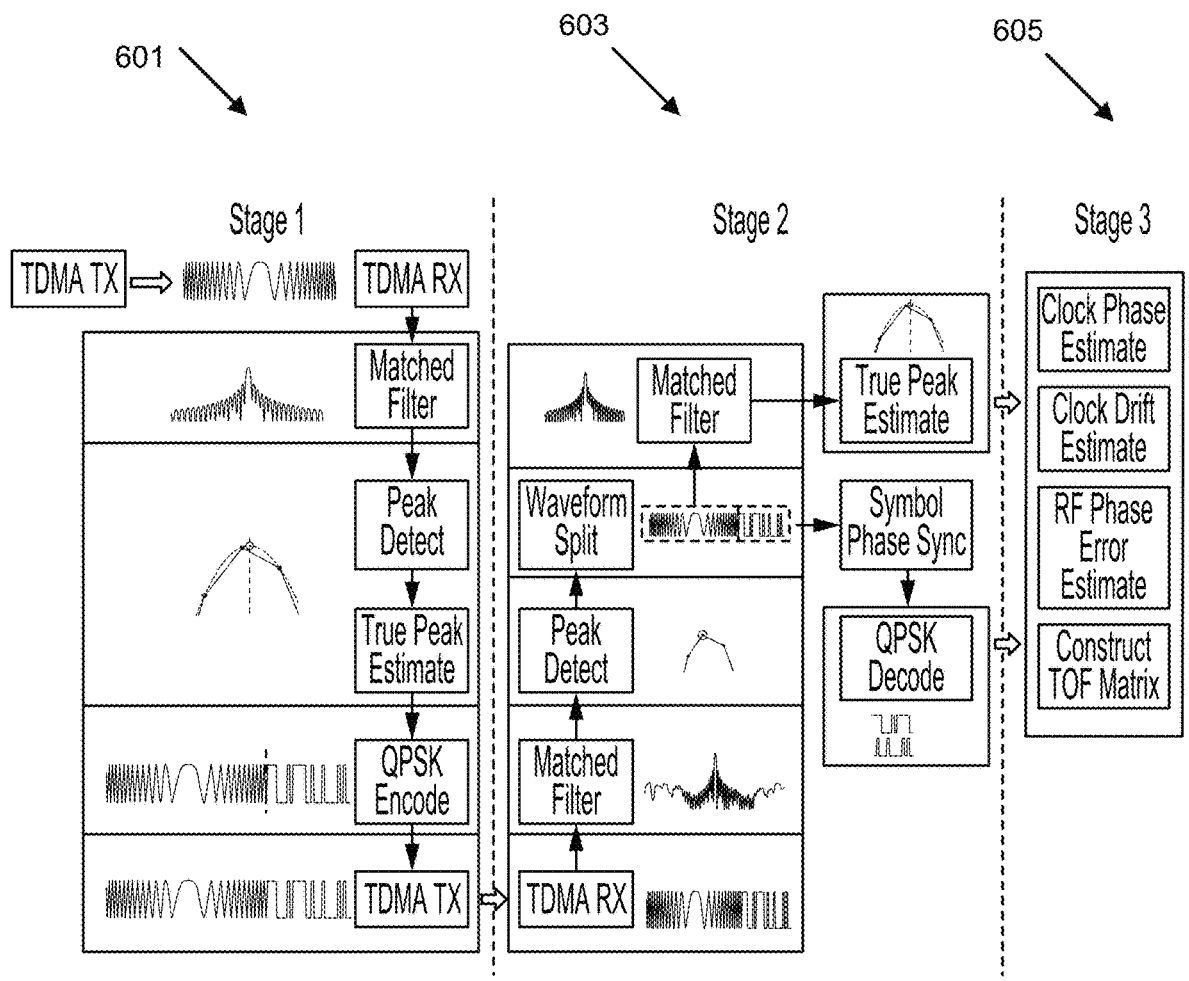
FIG. 6 illustrates stages of a protocol for processing and exchanging of information including time of flight data between sensors, in accordance with various embodiments.

Systems and methods herein encode and exchange time of flight data between the sensors wirelessly using quadrature phase shift keying (QPSK) modulation. Define $\grave{t}_{pk:i,j}$ as the TOF delay as measured by sensor i for the synchronization pulse sent by sensor j using the peak detection methods. In FIG. 6, stage one 601 shows this value encoded as a length $N_m$ QPSK message $m_{i,j}[n]$ that represents each sensor's combined estimate of channel delay and fractional clock phase offset.

$$m_{i,j}[n] = QPSK_{N_{sps}}(\grave{t}_{pk:i,j})[n] \quad (66)$$

where $QPSK_{N_{sp}}(\bullet)[n]$ is defined as a non-linear operator that performs quantization of a scalar input and creates a QPSK encoded waveform with the quantized bits encoded as symbols and with $N_{sps}$ samples per symbol.

TOF messages obtained from every other sensor are appended to the end of sensor i's synchronization waveform $s_i[n]$, which has support over the interval $[0, L-1]$ and is zero elsewhere, to produce the stage two 603 TX waveform $\grave{s}_i[n]$ $$\grave{s}_i[n] = s_i[n] + \sum_{j=0}^{N-2} m_{i,j}[n - L - jN_m] \quad (67)$$

Now each sensor transmits its stage two waveform $s_i[n]$ in the allocated TDMA time slot, while every other sensor receives and decodes the messages. Once this operation is complete, every sensor in the network will have complete knowledge of the local pair-wise TOF measurements of all sensors and the synchronized TOF between them as well as the relative RF phase measurements. From this information, each sensor constructs identical TOF (22) and clock phase error (23) matrices for the entire network as shown in stage three 605 of FIG. 6.

This broadcast messaging scheme is extended to encode additional information including residual carrier phase error measurements from (39), which are used estimate and correct TX/RX LO phase offsets.

Figure 7:
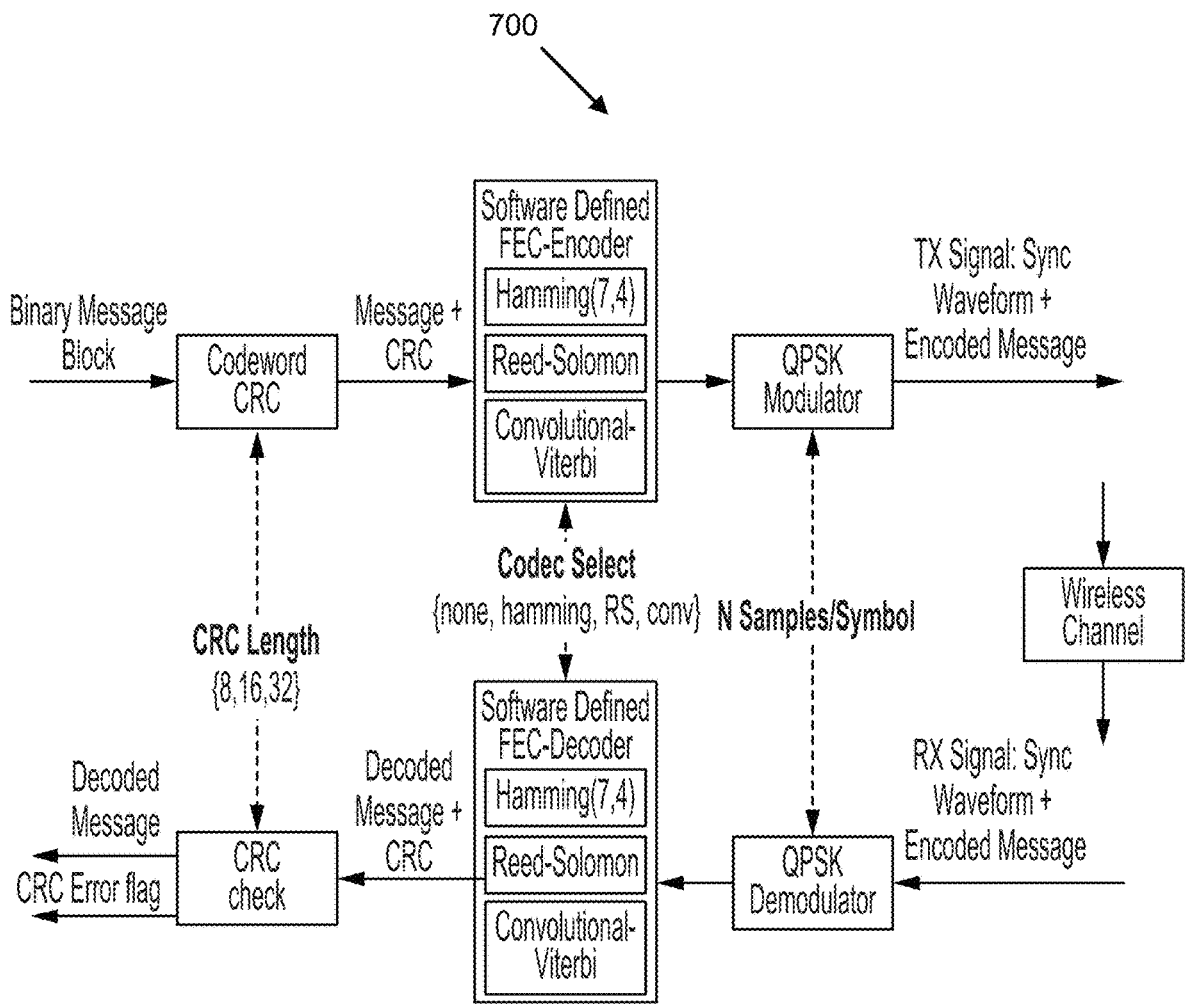
FIG. 7 shows an architecture of a software defined codec for use in processing and exchanging of information, in accordance with various embodiments.

Because the proposed synchronization scheme requires error free exchange of messages between sensors, the system and method implements a forward error correction (FEC) coder/decoder (codec) that is software configurable to utilize the lowest complexity and highest rate code possible given the SNR conditions of the operating environment. FIG. 7 shows the architecture 700 of the software defined codec.

Sensor Localization

When all sensors have knowledge of the TOF between all sensors in the network as a TOF matrix, it is possible to use the TOF to estimate the positions of each sensor. The system and method may include a derived localization algorithm that uses the TOF matrix derived in Eqn. (22). Because each sensor has the identical TOF matrix, in principle, each sensor can independently determine the positions of all of the other sensors.

Define X as an N×3 matrix with columns corresponding to the free space coordinates (x, y, z) of each sensor in the network. Denote the $i^{th}$ row of X as $x_i = (x_i, y_i, z_i)$. R is the N×N matrix of relative RF time of flight range measurements, which is known by each sensor in the network. $R_{i,j} = c \cdot TOF_{i,j}$ indicates the line of sight distance between sensor i and j. Note that R is symmetric with zeroes along the diagonal.

The relative coordinates of all nodes in the network $\dot{X}$, may be estimated by minimizing the following cost function:

$$\dot{X} = \operatorname{argmin}_{x,y,z} \sum_{i=0}^{N-2} \sum_{j=i+1}^{N-1} \left( \|x_i - x_j\|_{l_2} - \dot{R}_{i,j} \right)^2 \quad (68)$$

where the operator $\|(\bullet)\|_{l_2}$ indicates the L-2 Euclidean norm. Equation (68) may be minimized using any number of Newtonian or gradient based methods, which could be implemented locally on sensor nodes. Once the solution of $\dot{X}$ is found, each node knows the position of all nodes in the network.

Hardware Implementation

For an example implementation, various hardware is utilized. For example, the USRP E312 SDR from Ettus Research may be used. The E312 is a battery operated 2 X 2 MIMO capable embedded SDR with a Xilinx Zynq 7020 FPGA+ARM Processor SoC and an Analog Devices AD9361 RF frontend transceiver. Specifications for the USRP E312 are provided in Table I.

TABLE I

| Parameter | Value |
| --- | --- |
| Sampling Rate, $f_s$ | 50 MHz |
| Analog Bandwidth, $B_s$ | 56 MHz |
| Tunable Center Frequency, $f_c$ | 70 MHz-6 GHz |
| TX Gain Range | 0-89.5 dB |
| RX Gain Range | 0-76 dB |
| Size | 133 × 68.2 × 31.8 mm |
| Price | $3199.00 |

Figure 8A:
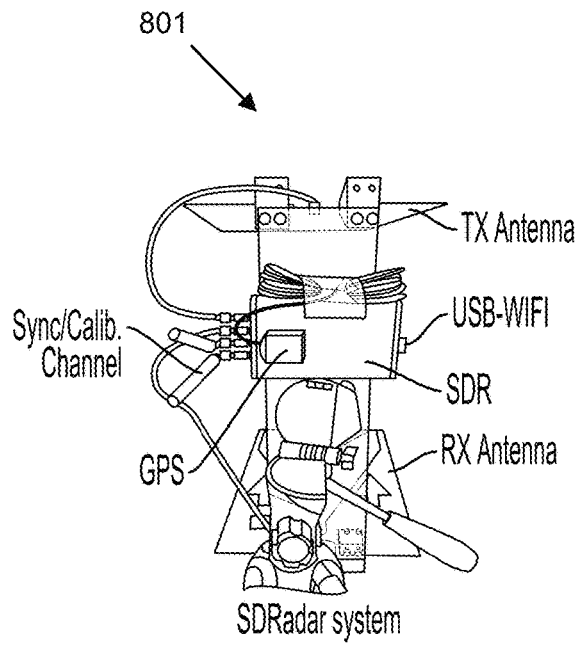
FIG. 8A depicts a demonstration of a proposed synchronization algorithm, in accordance with various embodiments.
Figure 8B:
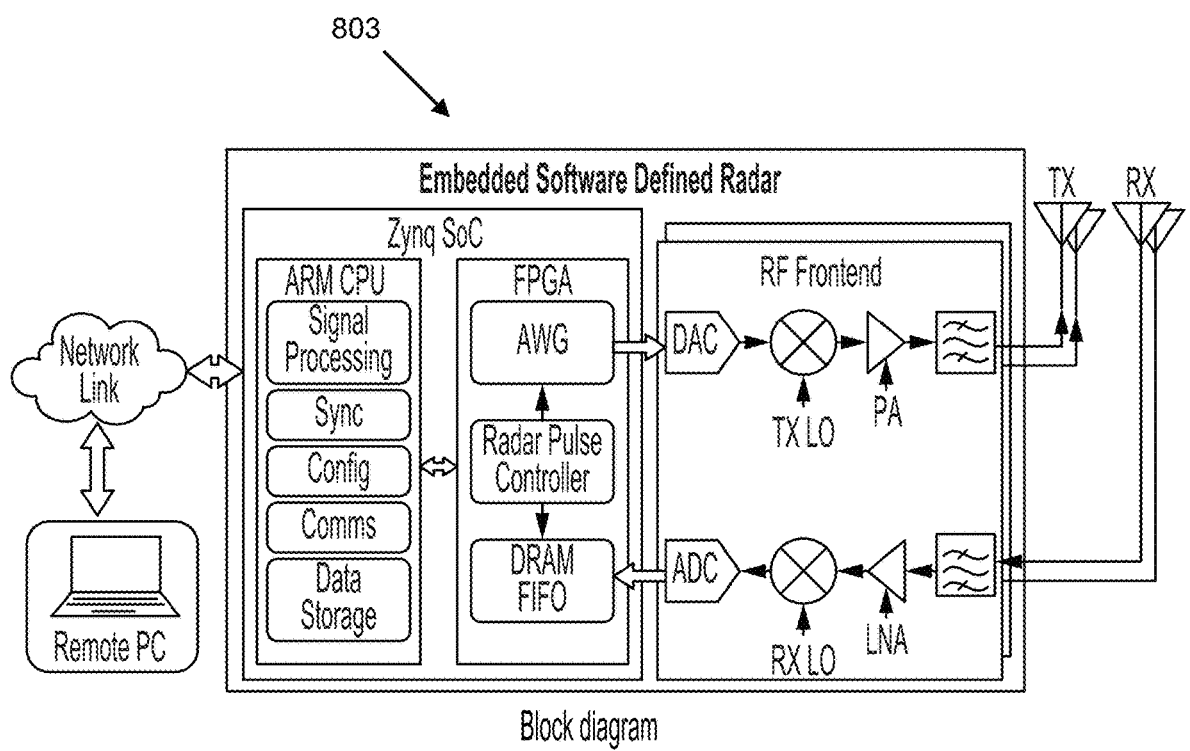
FIG. 8B depicts a system block diagram of components associated with the demonstration of FIG. 8A.

Referring to FIG. 8A, for a demonstration of the proposed synchronization algorithm, a software defined radar 801 (SDRadar) is implemented in an Ettus USRP E312 SDR. All synchronization algorithm components described herein are fully implemented in C++ and run in real-time on the embedded processor. FIG. 8B provides a system block diagram 803 of the C++ software and FPGA firmware functional components implemented in the embedded device.

Experimental Characterization

This section presents results from selected experiments that demonstrate the performance of the synchronization algorithm on the SDRadar platform shown in FIG. 8A.

A. 3-Array TOF synchronization: This experiment demonstrates a lower-bound performance of the wireless synchronization algorithm for three SDRadar sensors. The sensors are arranged at the vertices of an equilateral triangle. FIGS. 9A-C each show one of three experimental setups. FIG. 9A shows near configuration 901 with 1 m separation, FIG. 9B shows a medium configuration 903 with 5 m spacing, and FIG. 9C shows a far configuration 905 with 10 m separation. The synchronization performed at an RF center frequency of 1 GHz and repeated once per second for 1000 seconds. The performance is dependent on the signal to noise ratio (SNR). A high SNR is maintained during the experiment by increasing the TX gain in the SDRadar as the distance between sensors increases.

Figure 10A:
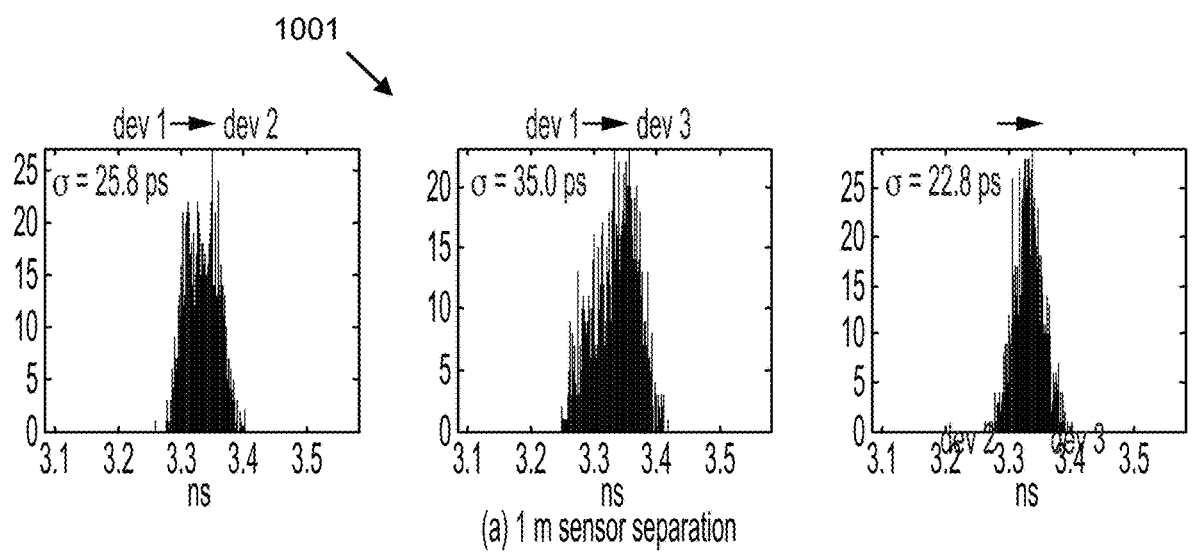
FIGS. 10A-C show synchronization precision as histogram plots for the different experimental setups of FIGS. 9A-C, in accordance with various embodiments.
Figure 10B:
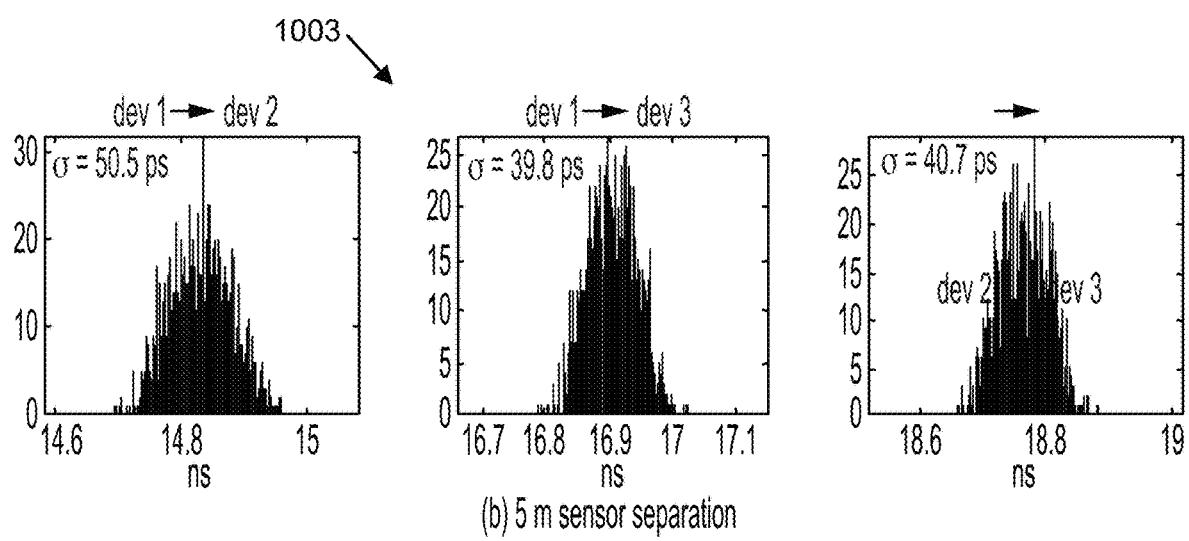
Figure 10C:
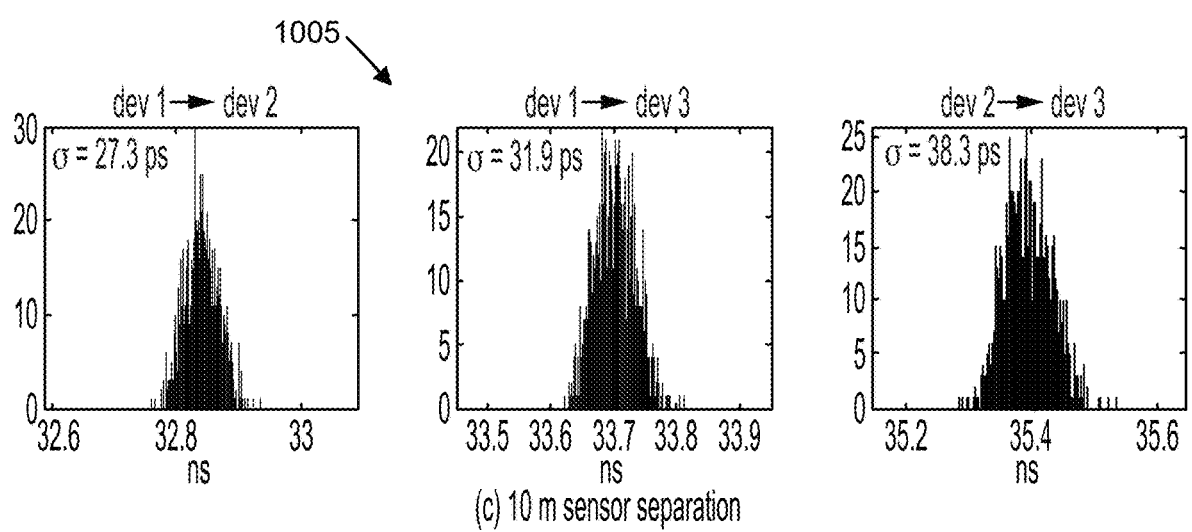

FIG. 10A shows synchronization precision as histogram plots 1001 of the synchronized TOF measurements for all sensor pairs for 1 m spacing (near configuration 901, FIG. 9A). FIG. 10B shows synchronization precision as histogram plots 1003 of the synchronized TOF measurements for all sensor pairs for 2 m spacing (medium configuration 903, FIG. 9B). FIG. 10C shows synchronization precision as histogram plots 1005 of the synchronized TOF measurements for all sensor pairs for 10 m spacing (far configuration 905, FIG. 9C).

Thus, FIGS. 10A-C show the synchronization precision as histogram plots of the synchronized TOF measurements for all sensor pairs. Sub-100 picosecond (ps) synchronization precision is obtained in an outdoor LOS environment using the methods provided herein, where each reported TOF estimate is obtained from just two transmissions per sensor.

frequency measurements using stepped-frequency radar techniques to reconstruct a synthetic wideband waveform (SWW). In order to achieve this bistatically, the developed synchronization algorithm is used to wirelessly synchronize two SDRadar sensors. The USRP E312 SDRs used have two RX and two TX channels. Using one TX/RX pair for synchronization and the second TX/RX channel for radar measurement, ultra-wideband radar pulses are synthesized by coherently combining a sequence of smaller bandwidth sub-bands.

All stepped frequency sub-pulses are synchronized and independently, with the synchronization routine running at each frequency step. The synchronization method is used to (i) correct the clock phase error (time synchronize), (ii) correct the frequency-dependent LO phase error due to sample clock offset (RF carrier phase synchronize), (iii) correct the random phase error due to LO re-tuning which is

TABLE II

| Test | Dev 1 → Dev 2 | Dev 1 → Dev 3 | Dev 2 → Dev 3 |
|---|---|---|---|
| | | Standard Deviation | |
| 1 m Separation | .77 cm (25.8 ps) | 1.05 cm (35.0 ps) | 0.67 cm (22.8 ps) |
| 5 m Separation | 1.52 cm (50.5 ps) | 1.19 cm (39.8 ps) | 1.22 cm (40.7 ps) |
| 10 m Separation | .82 cm (27.3 ps) | 0.96 cm (31.9 ps) | 1.15 cm (38.3 ps) |
| | | Mean | |
| 1 m Separation | 1 m (3.33 ns) | 1 m (3.33 ns) | 1 m (3.33 ns) |
| 5 m Separation | 4.5 m (14.8 ns) | 5.1 m (16.9 ns) | 5.6 m (18.8 ns) |
| 10 m Separation | 9.9 m (32.8 ns) | 10.1 m (33.7 ns) | 10.6 m (35.4 ns) |

In Table II, statistics for the experiments are given. Data is shown for one of the sensors, because the complete TOF sync information is known identically among all sensors in the network. Consequently, $T\hat{O}F_{i,j}=T\grave{O}F_{j,i}$ exactly as the proposed synchronization protocol (in the absence of decoding errors) guarantees shared knowledge of all TOF measurements across the network. The 1 m separation test is used to calibrate the sensor TOF mean values reported in Table II.

Figure 11A:
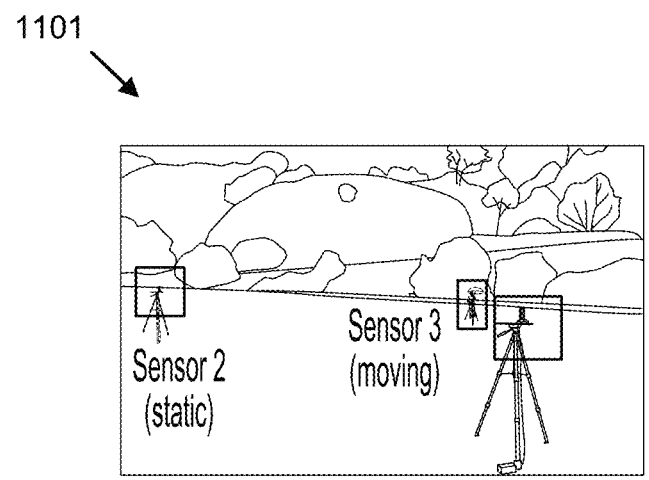
FIG. 11A shows a test setup for localization using three sensor triangulation, in accordance with various embodiments.
Figure 11B:
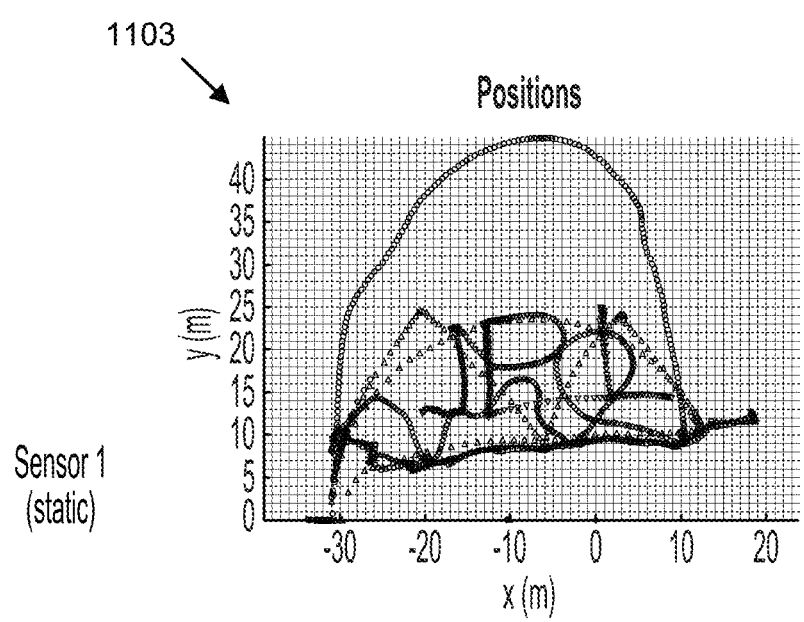
FIG. 11B shows an estimated sensor path of a sensor according to FIG. 11A, in accordance with various embodiments.

B. 3-Array TOF Localization: This disclosure demonstrates localization using three sensor triangulation. The position is fixed for two sensors with a separation of 10 m. The third SDRadar sensor is moved along a variety of recognizable paths. The position of the moving sensor is estimated from the TOF matrix using constrained solution triangulation give herein previously. FIG. 11A shows test setup 1101. FIG. 11B shows estimated sensor path 1103, where a 10 point moving average has been applied to the estimated positions. When the third sensor is too close to the axis formed by the two fixed sensors, the solution is ill formed, which is shown by the feature in the position paths in the lower left of FIG. 11B.

C. Bistatic Wireless Reflector Test: In order to obtain high resolution, it is possible to coherently combine multiple characteristic of the AD9361 RFIC frontend (RF carrier phase synchronize), and (iv) remove frequency dependent signal path delays due to hardware. Only after all of these steps have been successfully completed is coherent reconstruction of the high resolution SWW possible.

Figure 12:
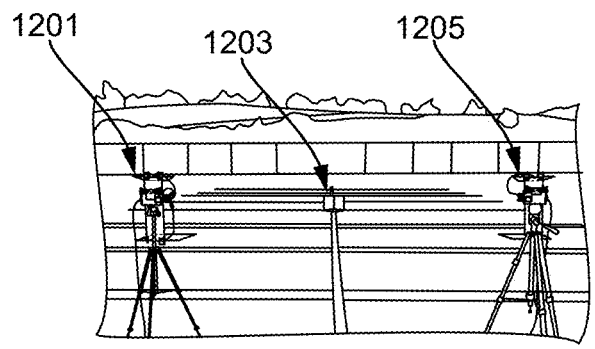
FIG. 12 shows a two-sensor setup for a bistatic wireless reflector test, in accordance with various embodiments.
Figure 13:
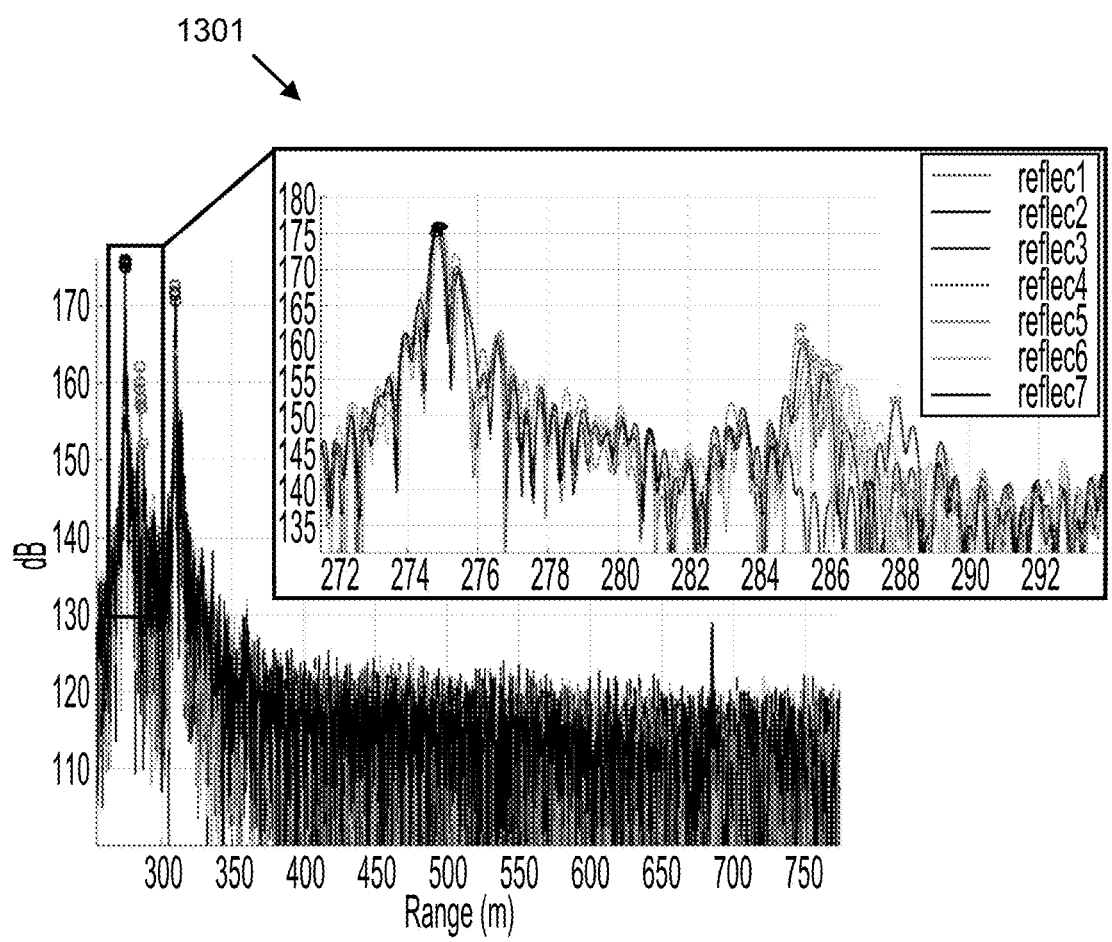
FIG. 13 shows a graph of range versus dB for bistatic radar tests using wireless synchronization and the two-sensor setup of FIG. 12, in accordance with various embodiments.

The two-sensor setup for the experiment is shown in FIG. 12. A first sensor 1201 and a second sensor 1205 are spaced apart from each other and from a reflector 1203. The system and method synthesizes 391 MHz (38.4 cm theoretical radar resolution) of bandwidth, stepping from 1211 to 1552 MHz in 25 MHz steps and collecting 50 MHz bandwidth LFM chirp sub-pulses at each of the 16 frequency steps. The capability of the developed synchronization algorithm and SDRadar to perform coherent stepped frequency radar imaging using a wireless link for synchronization is demonstrated experimentally in FIG. 13. FIG. 13 shows a graph of range versus dB illustrating bistatic radar tests using wireless synchronization to synchronize two sensors (first sensor 1201 and second sensor 1203, FIG. 12) across all 50 MHz bandwidth sub-bands so that coherent stepped frequency radar may be performed (391 MHz total bandwidth synthesized). Measurement statistics showing precise localization of reflector targets to within 10 cm are given in Table III.

TABLE III

| | Reflector Location | | | | | | |
|---|---|---|---|---|---|---|---|
| Result | 1 | 2 | 3 | 4 | 5 | 6 | 7 |
| True Range (m) | 10.77 | 10.87 | 10.97 | 11.07 | 11.38 | 11.67 | 13.42 |
| Measured Range (m) | 10.85 | 10.93 | 11.09 | 11.22 | 11.56 | 11.89 | 13.63 |
| Std. Deviation (cm) | 1.88 | 3.92 | 5.05 | 3.38 | 2.79 | 1.91 | 3.44 |

TABLE III-continued

| Result | Reflector Location | | | | | | |
|---|---|---|---|---|---|---|---|
| | 1 | 2 | 3 | 4 | 5 | 6 | 7 |
| Std Deviation (ps) | 125.6 | 261.3 | 336.9 | 225.1 | 185.8 | 127.5 | 229.2 |
| −3 dB Peak Width (cm) | 32.2 | 33.0 | 35.7 | 58.2 | 34.8 | 30.2 | 32.4 |

Measured distances provided are from the legs of the camera stand holding the radar to the corner point of the reflector on the ground. The antenna height above the ground surface is 1.1 m. The measured −3 dB target echo peak widths are also given in Table III. The mean direct path −3 dB peak width for all trials was 32.7 cm and the mean −3 dB peak width of the target echo for all reflector positions was 36.6 cm. For reference, the −3 dB down peak width for an ideal 391 MHz LFM chirp waveform was estimated as 33.9 cm using the same algorithm, thus demonstrating that proposed synchronization method achieves the time and phase coherence across multiple independent frontend frequency bands necessary to reconstruct a SWW that achieves the theoretical bandwidth resolution performance.

Stepped frequency radar requires sub-pulses to be both time and phase coherent in order to realize resolution improvements. Therefore, this experiment demonstrates that coherent wireless bistatic/multistatic radar operation is feasible with the proposed synchronization scheme.

D. 3-Sensor Transmit Synchronization: This experiment demonstrates phase coherent transmission synchronization for three sensors operating in MIMO fashion. That is, all sensors transmit mutually orthogonal waveforms (in this case via TDMA scheme) which in turn are received by all sensors. Using the synchronization scheme detailed previously, the system and method performs time and phase synchronization of baseband waveforms to the global average clock phase offset prior to transmission for each sensor by applying the time and phase pre-corrections derived herein. Note that although no MIMO processing is performed using the synchronized signals, the purpose of this test is to demonstrate the precision achieved with the proposed system and method and to support the feasibility of this system and method for wirelessly synchronizing elements of a coherent MIMO or multistatic array.

While the demonstration of two sensor synchronization is insufficient to prove the validity of a given synchronization scheme for N sensors, demonstration of the three sensor case does indeed prove global synchronization and extends to the N sensor case. This is because in the three sensor case, synchronization of a transmitter with two independent receivers or of two independent transmitters with a third independent receiver can only occur if the transmitted signals are synchronized in the air.

Figure 14A:
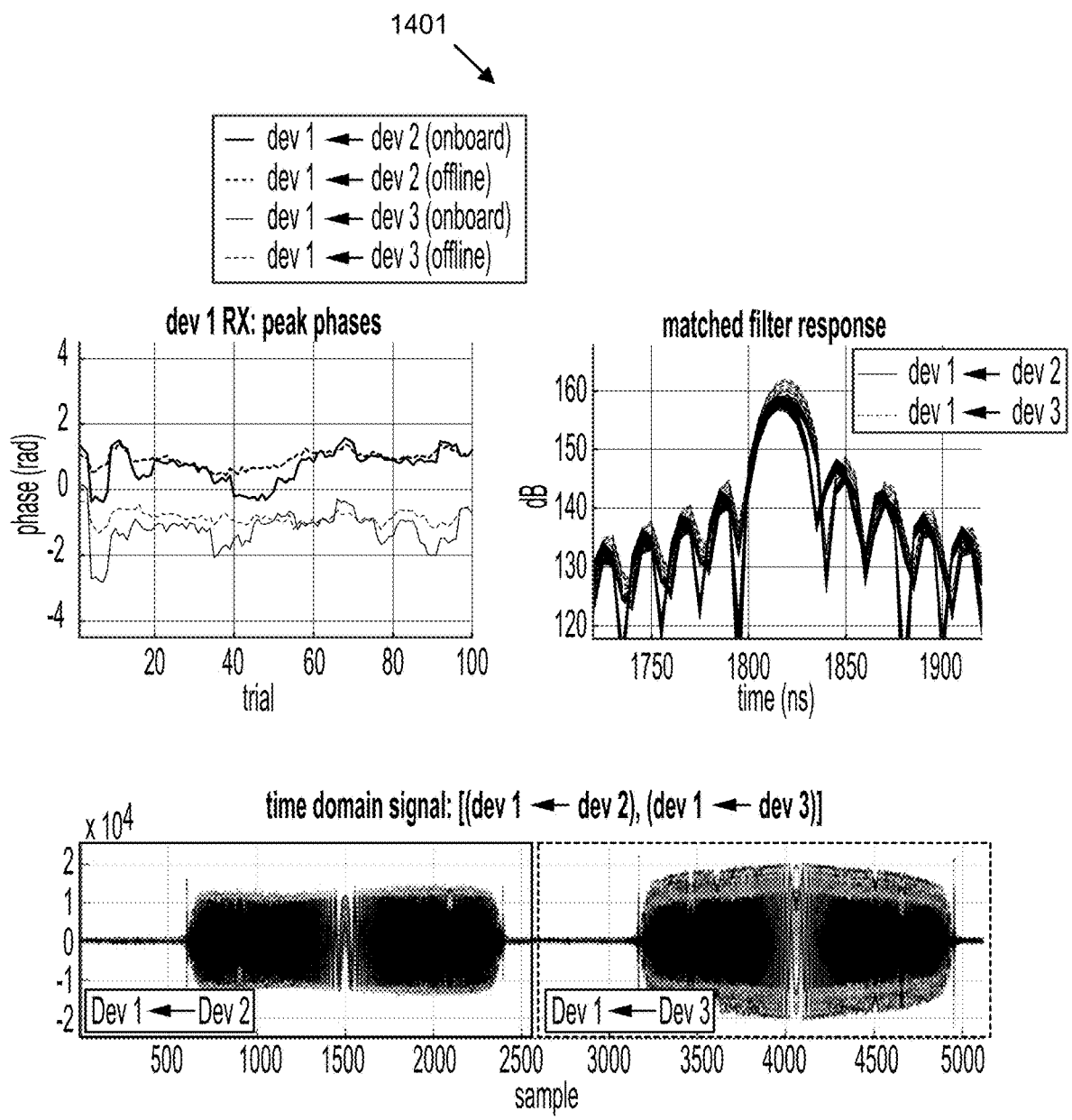
FIGS. 14A-C show results from a full 3×3 MIMO transmit synchronization test, in accordance with various embodiments.
Figure 14B:
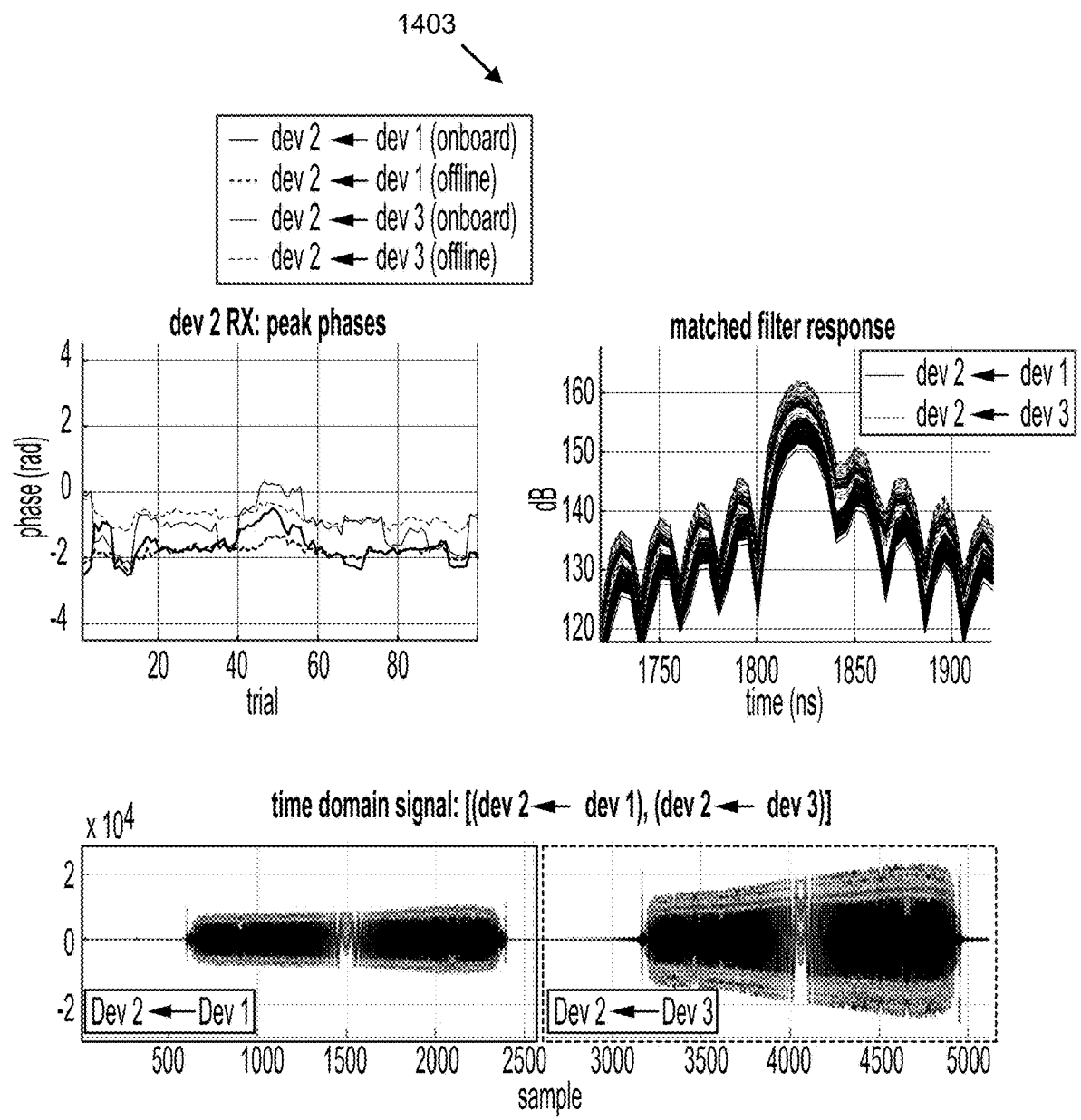
Figure 14C:
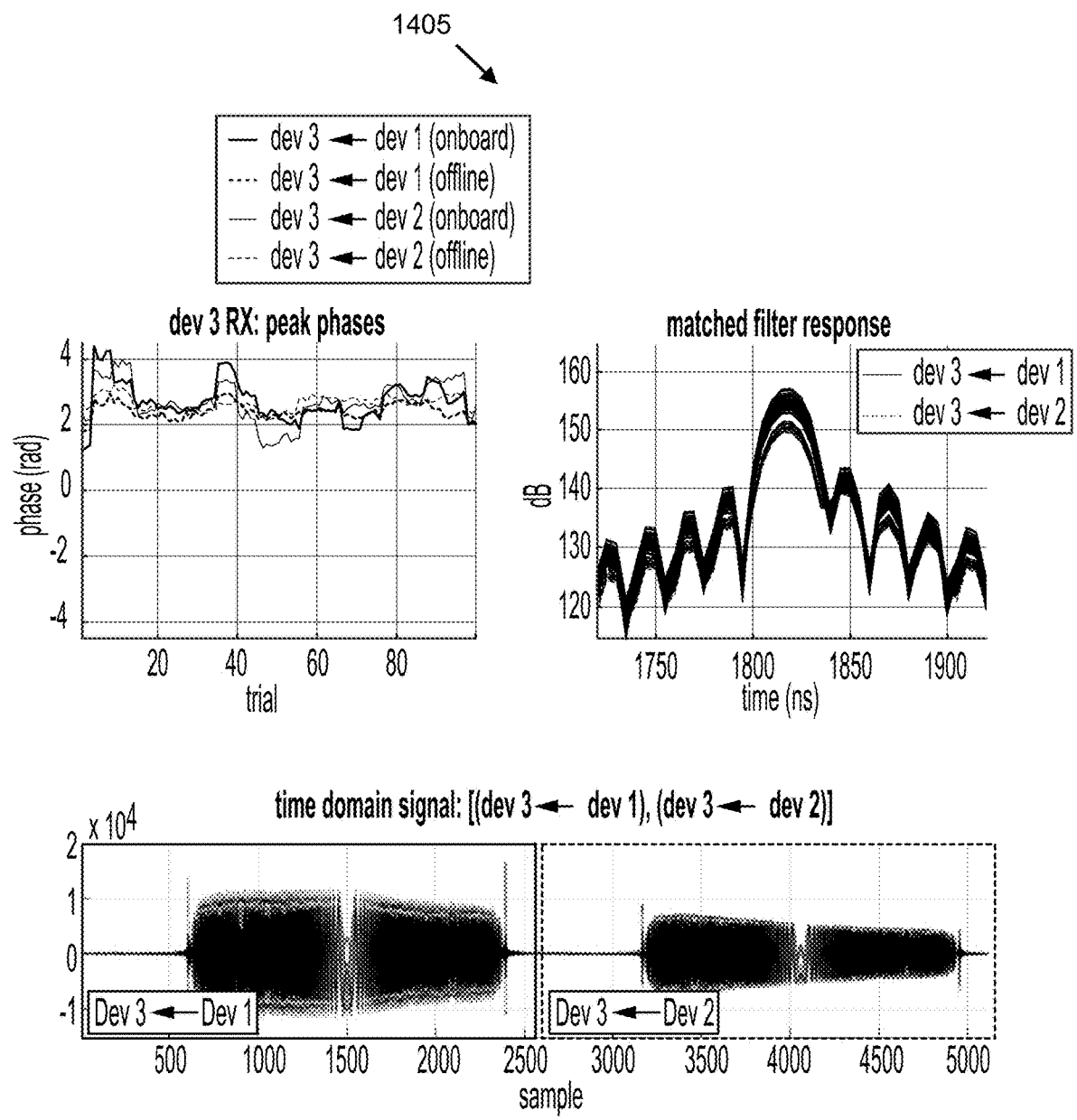

FIGS. 14A-C show results from the full 3×3 MIMO transmit synchronization test. The test is performed at a frequency of 1.1 GHz over 100 trials at a PRI of 0.2 s. The raw time domain signal samples, matched filter response, and the carrier phase are shown for all 6 MIMO signals. The 3 monostatic cases, where a given sensor receives the signal transmitted by itself, are omitted. FIG. 14A shows results 1401 in which sensor one receives signals from sensor two and sensor three. FIG. 14B shows results 1403 in which sensor two receives signals from sensor one and sensor three. FIG. 14C shows results 1405 in which sensor three receives signals from sensor one and sensor two. For the signals received by each of the three SDRadar sensors, the time domain waveforms samples (bottom), the waveform phase in radians (upper left), and the signal time domain matched filter response (upper right) are shown for the signals transmitted by each of the other two sensors. Statistics are given in Table IV.

TABLE IV

| Param. | Device Exchange | | | | | |
|---|---|---|---|---|---|---|
| | 1←2 | 1←3 | 2←1 | 2←3 | 3←1 | 3←2 |
| Estimated SNR (dB) | 29.5 | 30.7 | 35.9 | 35.7 | 37.5 | 31.2 |
| $\sigma_2$-TOF (ps) | 4.4 | 3.8 | 2.1 | 2.1 | 1.7 | 3.6 |
| Std. Dev. | Offline Sync (.02 s effective processing latency) | | | | | |
| TOF sync (ps) | 12.4 | 7.6 | 12.4 | 6.2 | 7.6 | 6.2 |
| TX Radar TOA (ps) | 29.8 | 27.4 | 18.2 | 31.7 | 27.5 | 30.8 |
| TX RF Phase (rad) | 0.239 | 0.192 | 0.198 | 0.230 | 0.243 | 0.237 |
| Std. Dev. | Onboard TX Sync (.16 s processing latency) | | | | | |
| TOF sync (ps) | 14.2 | 19.0 | 14.2 | 11.3 | 19.0 | 11.3 |
| TX Radar TOA (ps) | 91.7 | 110.9 | 79.5 | 119.0 | 108.7 | 114.3 |
| TX RF Phase (rad) | 0.525 | 0.550 | 0.471 | 0.619 | 0.632 | 0.629 |

The reader may observe that the residual RF phase errors are symmetric. That is, the uncompensated RF carrier phase, as shown in FIGS. 14A-C, e.g., for Dev. 1←Dev. 2 and Dev. 2←Dev. 1 exhibit symmetry. This is due to the relatively large processing latency of the current embedded software implementation over which time, each clock drifts relative to the others. This symmetry indicates that better performance may be achieved by a faster implementation with less time between the synchronization epoch and the radar pulse transmission. This is discussed further in the section entitled "DISCUSSION."

FIGS. 14A-C show phase coherent transmit to sub-nanosecond time precision and phase precision of $$\sim \frac{\pi}{5}\left(\text{i.e., } \frac{\lambda}{10}\right).$$

The results presented have not undergone any post-processing and represent the raw data recorded by each sensor. The experimental statistics are given in Table IV. The corrections applied to the transmit waveforms assume that local clock offsets remain fixed from the time the synchronization is performed to when the synchronized radar pulses are transmitted. As previously noted, this is not the case, and the addition of a predictive model of the clock drift, which may be accurately treated as linear in nature over short time spans, yields even further improved performance.

The time between the sync operation and the transmission of the corrected/synchronized TX pulses is ~0.16 s. This delay is due to the synchronization processing being performed in real-time running software on the embedded Zynq-7020 SoC ARM processor.

In this same experiment, however, after the synchronization epoch, there is also a transmission and reception of two sets of pulses: one through the calibration/synchronization channel (the reference pulse), and one through the radar antenna channel (the data pulse) which are saved directly to file. The pulses on the calibration channel are identical to those sent during the synchronization epoch, however the pulses are saved rather than processed onboard. Because there is no onboard processing performed between TX/RX of the reference pulses and the data pulses, the time between them is ~0.02. This allows performance of offline processing to 'see' what the output of the synchronization would have been if the time between the synchronization exchange and TX synchronized radar pulse transmission was only ~0.02.

Results are provided from offline synchronization processing for the ~0.02 second reference pulse and data pulse delay in Table IV. Here, the phase precision is $$\sim \frac{\pi}{14}\left(\text{i.e., } \frac{\lambda}{28} = 036\lambda\right).$$

Note that the 0.02 s delay between the reference and data pulses is primarily due to file write operations for saving the raw data and it is reasonable to expect that a faster implementation of the synchronization processing, which does not require file I/O, could execute with much lower latency.

The SNR values reported in Table IV are estimated directly from the raw signal data and are used to calculate the expected CRLB for comparison. The two way TOF CRLB $\tau_{2\text{-}TOF}$ reported in Table IV is related the the TOF CRLB $\tau_{TOF}$ given in (42) as $$\sigma_{2\text{-}TOF} = \frac{\sigma_{TOF}}{\sqrt{2}}$$

(see the section entitled "CRLB DERIVATION" for further discussion). Note that the two-way TOF CRLB is highly sensitive to SNR, which in this case has a considerable degree of uncertainty as it is estimated solely from the raw signal data.

Experimental System Applications

Figure 15A:
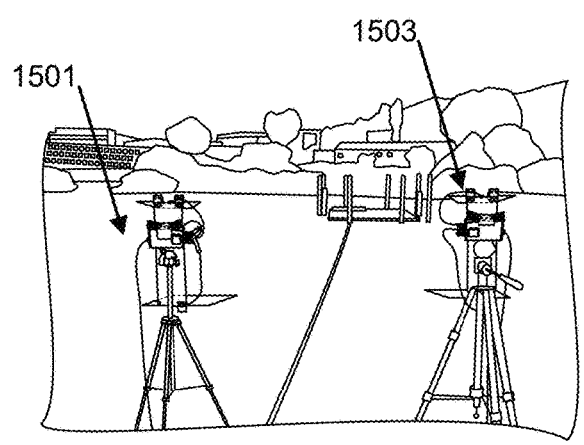
FIG. 15A shows a two sensor setup illustrating a bistatic radar test using a wireless synchronization algorithm to synchronize two sensors across all frequency bands coherently, in accordance with various embodiments.
Figure 15B:
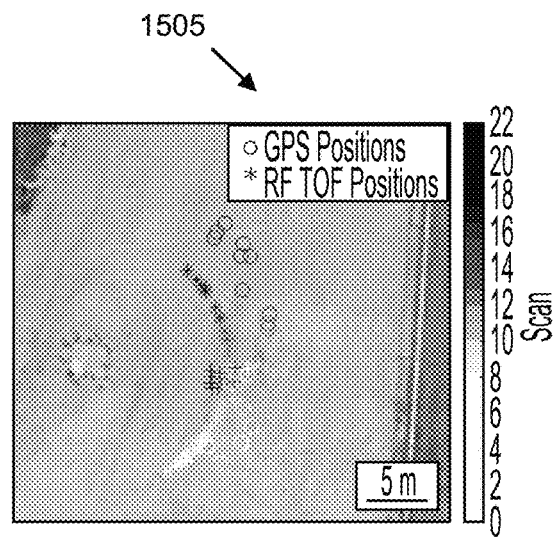
FIG. 15B shows a map of GPS versus RF TOF sync-based position estimates for the moving sensor of FIG. 15A, in accordance with various embodiments.

A. Bistatic Semi-Circle Aperture Test: In this experiment, a synthetic aperture is formed in a semicircular array by moving one sensor in an arc around a central grouping of targets. The two sensor setup is shown in FIG. 15A which illustrates a bistatic radar test using wireless synchronization algorithm to synchronize two sensors (first sensor 1501 and second sensor 1503) across all frequency bands coherently. FIG. 15B shows a map 1505 of GPS versus RF TOF sync-based position estimates for the moving sensor. The position of the moving sensor is overlaid on satellite imagery as shown in FIG. 15B. Positions obtained from both GPS and RF time of flight measurements are shown, with synchronization algorithm-based positions having significantly higher accuracy than those given by GPS.

Figure 16A:
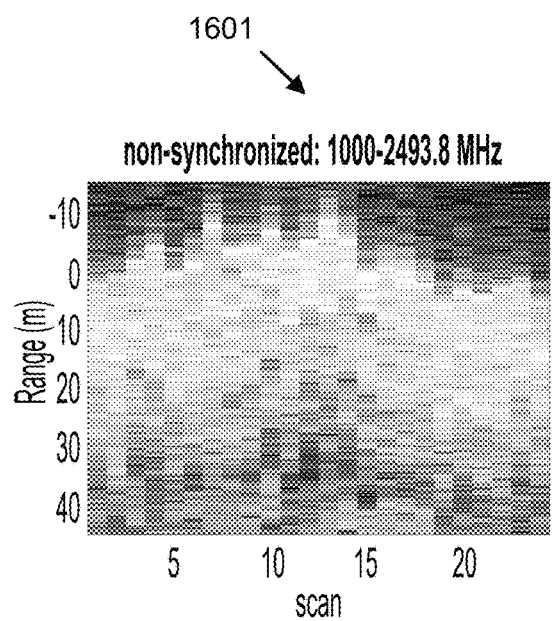
FIG. 16A shows raw frequency stepped synthetic wideband radar data from a moving receiver with GPS synchronization only, in accordance with various embodiments.
Figure 16B:
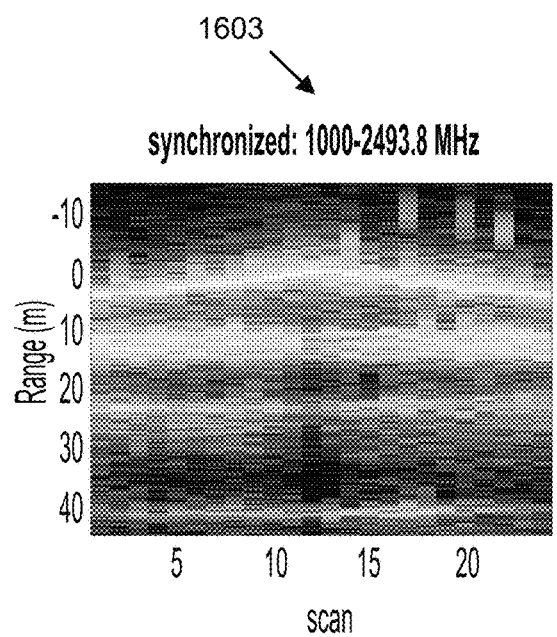
FIG. 16B shows raw frequency stepped synthetic wideband radar data from a moving receiver with both GPS synchronization and synchronization via the synchronization algorithm provided herein, in accordance with various embodiments.

FIG. 16A shows raw frequency stepped synthetic wideband radar data from the moving receiver with GPS synchronization only 1601. FIG. 16B show raw frequency stepped synthetic wideband radar data from the moving receiver with both GPS synchronization and synchronization via the synchronization algorithm 1603 provided herein. Here, the systems and methods synthesize a stepped frequency SWW with 1.5 GHz of bandwidth across an RF frontend range of 1-2.5 GHz in non-uniform frequency steps of ~36 MHz; performing the proposed synchronization method at each frequency step and reconstructing a SWW coherently. Without synchronization the echoes show no obvious pattern. With synchronization, the direct path (triangular feature in FIG. 16B), and the reflection from the objects are aligned to within a constant timing offset.

Figure 17:
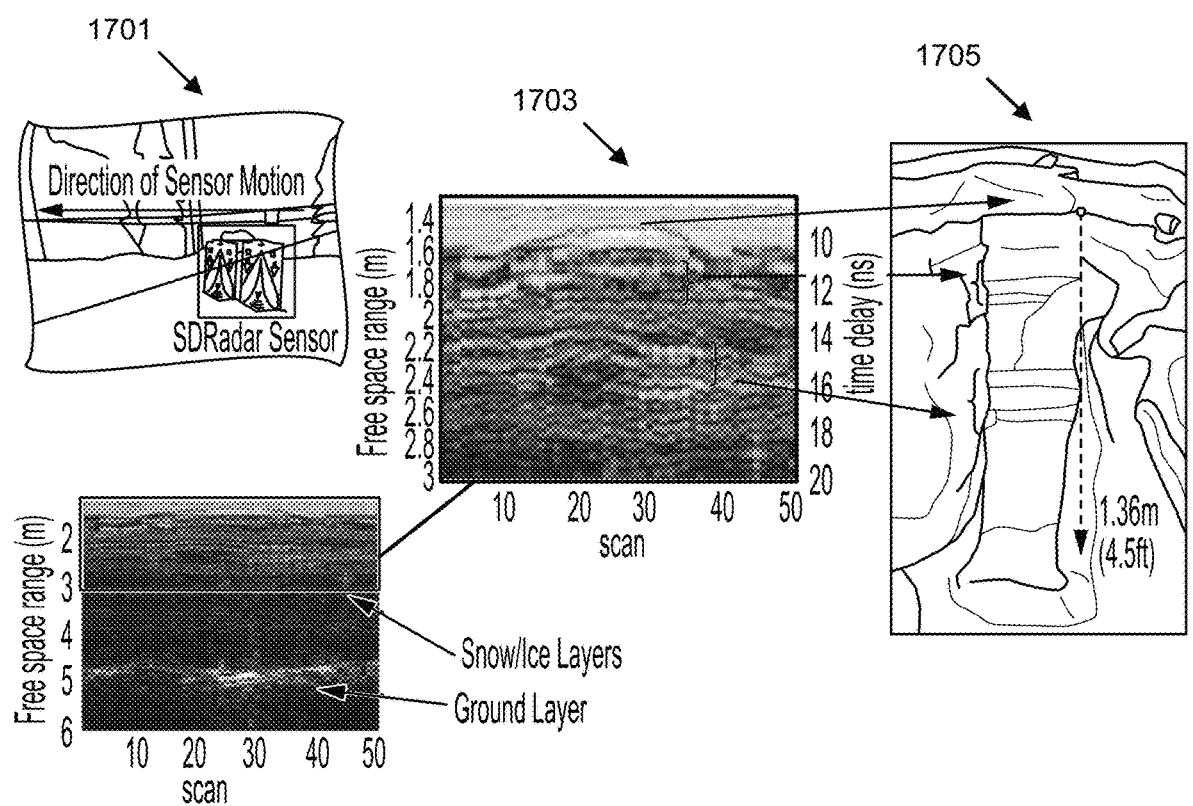
FIG. 17 shows an example snow penetrating radar test performed with two sensors that are synchronized to perform bistatic imaging, in accordance with various embodiments.

B. Snow Penetrating Radar Test: Monostatic and Bistatic: In this experiment, two SDRadar sensors (first sensor 1701, second sensor 1703) are synchronized to perform bistatic imaging of a snowbank in Mammoth Lakes, Calif. For comparison, a single SDRadar sensor is used in a monostatic configuration to image the same scene. The monostatic result is included here for comparison. In both the monostatic and bistatic cases, 2.5 GHz of bandwidth are synthesized from an operational frequency range of 600-3100 MHz using a non-uniform frequency step size. In the monostatic case, a single sensor is suspended from a fixed line 1.5 m above the surface of the snowbank and moved across the 25 m scene in 0.5 m steps. The monostatic test setup 1701 and resulting sub-surface radar image, along with a ground truth image 1703 of the snow and ice layers present in the snowbank 1705, are shown in FIG. 17.

Figure 18:
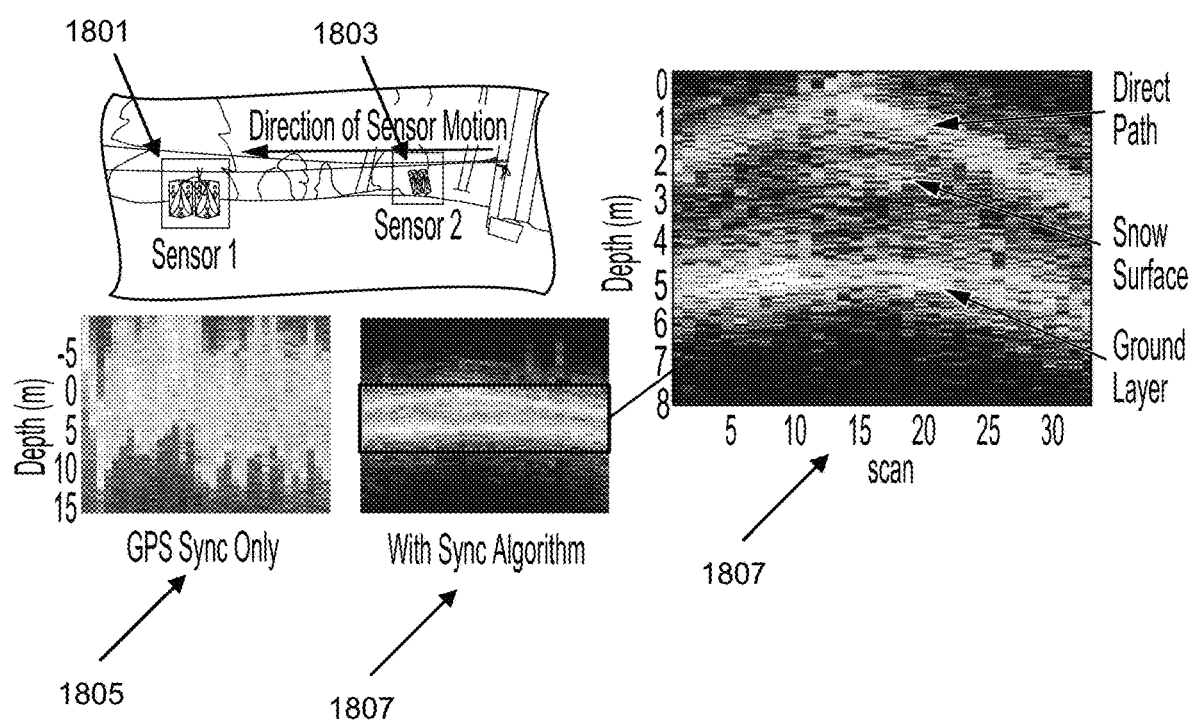
FIG. 18 shows a bistatic snow penetrating radar experimental set up, in accordance with various embodiments.

The bistatic snow penetrating radar experiment setup is shown in FIG. 18. One SDRadar sensor (sensor one, 1801) is suspended from a fixed line in a static position at the center of the transect and a second SDRadar sensor (sensor two, 1803) is moved across the 25 m transect in 0.5 m steps on a second fixed line.

The proposed method is used to synchronize the two SDRadar sensors at each frequency tuning step across the 2.5 GHz bandwidth used (72 frequency steps in ~36 MHz increments). By correcting clock and carrier phase errors, the entire 2.5 GHz bandwidth is combined coherently to form a SWW profile at each point along the transect. A comparison of the radar imaging results using GPS-based synchronization only 1805 and the method described herein with the synchronization algorithm 1807 is given in FIG. 18. The bistatic synchronized radar image with annotated features is shown in FIG. 18.

Due to the directionality of the antennas, the reflection from the snow surface and near-surface features are prominent only in the center of the image (when the two sensors are close to one another). For near-surface features, the monostatic case shown in FIG. 17 demonstrates superior imaging ability. However, the reflection from deeper targets, specifically the snow/ground interface as shown in FIG. 18, are significantly stronger. Further, the physical separation of antennas in the bistatic case improves the dynamic range of the entire system as higher transmit power may be used without saturating the receiver, allowing for better imaging of deeper targets. Thus, in a 2×2 MIMO configuration, wherein both monostatic and synchronized coherent bistatic imaging are performed, it is possible to achieve both high resolution of shallow targets as well as improved imaging of deeper features.

Figure 19A:
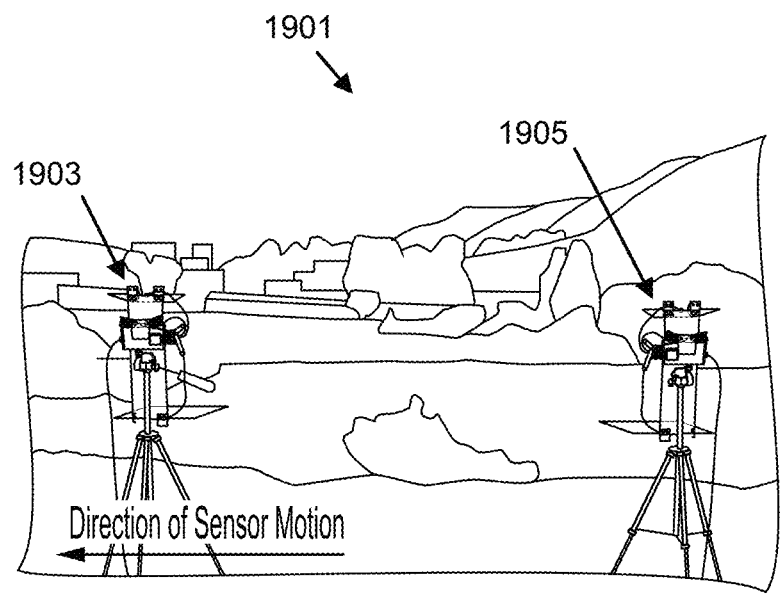
FIG. 19A shows a test setup for a bistatic linear aperture test with a wireless two bistatic sensor system imaging targets at far range, in accordance with various embodiments.
Figure 19B:
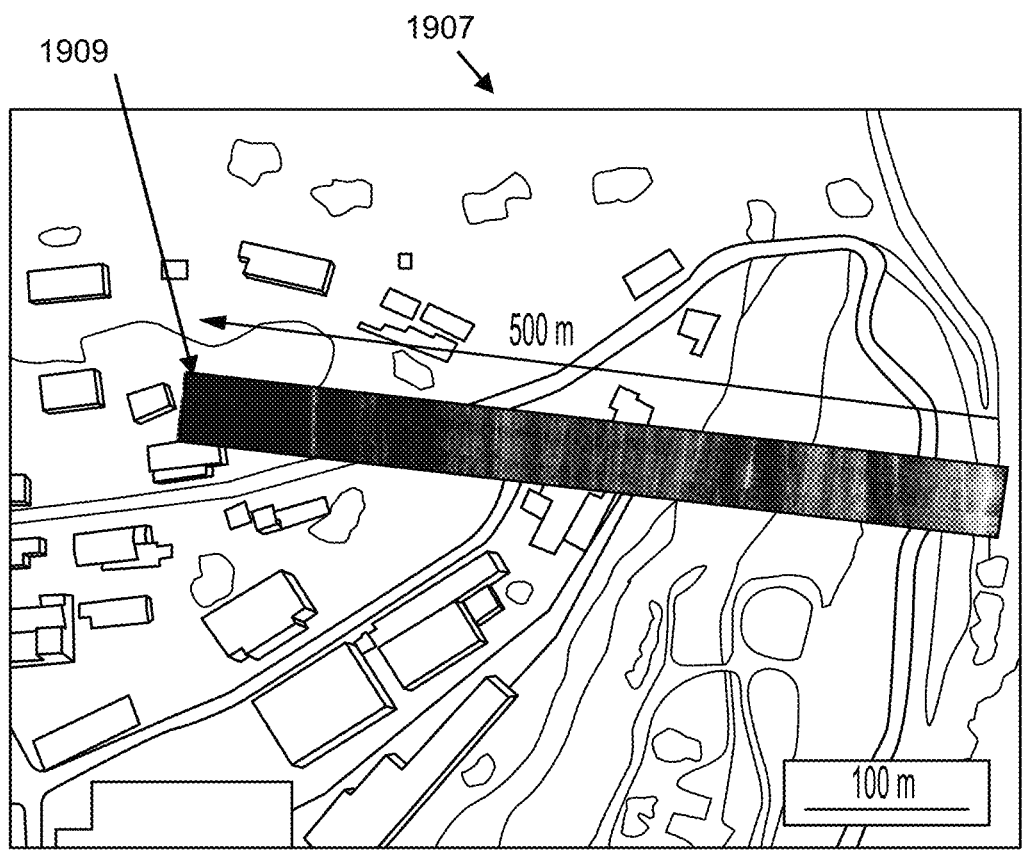
FIG. 19B shows a target scene for a test according to FIG. 19A, in accordance with various embodiments.

C. Bistatic Linear Aperture Test: This test demonstrates the ability of a wireless two SDRadar bistatic sensor system to image targets at far range. The system and method coherently synthesizes 200 MHz total bandwidth (1.51.7 GHz in ~25 MHz non-uniform steps). At each frequency step, synchronization is performed to enable coherent wideband synthesis. FIG. 19A shows the test setup 1901 and FIG. 19B shows the target scene 1907. Sensor one 1903 is moved in 20 cm increments across the aperture (98 steps total) while sensor two 1905 remains fixed. Note that after the 68$^{th}$ step, sensor 2 is repositioned at the end of the initial 68 step aperture. The resulting bistatic radar image 1909 is shown overlain on a satellite image of the test site in FIG. 19B. Due to the relatively small size of the aperture relative to the scattering scene, SAR azimuth focusing is not performed.

DISCUSSION

Each sensor's clock drifts over the time between the synchronization operation and the transmission of the corrected waveforms, causing a decoherence of the relative clock states estimated by the synchronization exchange from the relative clock states at the time of signal transmission. The results of the associated reduction of precision are reported in Table IV. There are three ways this issue could be addressed, which are independent of the synchronization algorithm itself. First, a higher quality oscillator with greater stability and lower phase noise (relax synchronization repetition frequency requirements) could be implemented. Second, a higher performance embedded processor (decrease processing latency for software implementation of synchronization algorithm) could be implemented. Third, a synchronization algorithm could be implemented in a FPGA (remove FPGA-to-processor data transfer bottleneck and perform synchronization processing with deterministic latency).

The synchronization processing as shown in FIG. 6, is relatively simple and could easily be performed onboard in milliseconds by a more powerful processor or FPGA. In an example implementation, the TDMA slot size is 100 μs, therefore the lower bound synchronization latency is is 2N×100 μs.

Furthermore, a limitation of the current hardware demonstration platform is that the two TX/RX channels cannot operate independently in parallel. In a more powerful hardware platform, which is capable of asynchronous multichannel operation, it would be possible to execute the synchronization algorithm on a separate dedicated side-channel asynchronously with respect to the radar data channel. In such a system, more sophisticated processing of synchronization results such as Kalman filtering could be used to improve clock state estimation and the precision of time and phase synchronization.

In this disclosure, systems and methods are provided for a consensus synchronization algorithm for distributed wireless sensor networks. The algorithm relies on syntonization and coarse synchronization from GPS signals and then improves synchronization precision by three orders of magnitude. In various embodiments, the proposed methods include that each sensor transmits twice in a synchronization epoch, meaning that the entire synchronization process is complete for the entire network of N sensors after 2N transmissions, making it an O(N) algorithm. Using the results from the synchronization procedure, the disclosure includes time and RF carrier phase corrections to baseband waveforms that may be applied on transmit in order to obtain network wide coherent transmit operation as well as coherent receive operation. Furthermore, the network pair-wise LOS distances are known globally as a result of the proposed scheme enabling decentralized simultaneous positioning of the network.

Because the scheme does not rely on real-time signal detection and response or any specialized hardware, it is implementable entirely in software on commercially available SDR platforms and is shown to achieve <100 ps time synchronization performance with 50 MHz signal bandwidth. The discussion validates method and system in numerous field experiments. The discussion demonstrates 3-sensor wireless time synchronization to <50 ps (and as low as ~10 ps in some cases), coherent phase synchronization of λ/28, cm-level positioning. The experiments have applied the synchronization method across multiple tuning frequencies to perform bistatic stepped-frequency radar coherently to synthesize bandwidths of up to 2.5 GHz. This work has numerous implications for distributed transmit beam forming, wireless sensor localization, and coherent MIMO radar imaging. In particular, this work is an enabling technology for low-cost high performance coherent MIMO radar sensor networks made up of SmallSat/CubeSat sensor constellations and autonomous sensor swarms.

CRLB DERIVATION

Referring to the discussion of the CRLB derivation provided above, the particular derivation has been presented separately in this section for clarity. The derivation begins with the general CRLB for a complex autocorrelation signal s(t) in complex white Gaussian noise with variance $\sigma_N^2$. The Fischer information matrix $I(t_{pk})$ for a delay parameter $t_{pk}$ is $$I(t_{pk}) = \frac{2}{\sigma_N^2} \text{Re}\left[\sum_{n=0}^{N-1} \left|\frac{\partial s[n; t_{pk}]}{\partial t_{pk}}\right|^2\right] \quad (A.1)$$

$$= \frac{2}{\sigma_N^2} \text{Re}\left[\sum_{n=0}^{N-1} \left|\frac{\partial s(t)}{\partial t}\right|_{t=n\Delta}^2\right] \quad (A.2)$$

Then the CRLB is $$\sigma_{TOF}^2 \geq \frac{\sigma_N^2/2}{\sum_{n=0}^{N-1}\left|\frac{\partial s(t)}{\partial t}\right|_{t=n\Delta}^2} \quad (A.3)$$

where $$\Delta = \frac{1}{f_s}.$$

Approximating the sum with an integral $$\sigma_{TOF}^2 \geq \frac{\sigma_N^2/2}{\frac{1}{\Delta}\int_0^{T_p}\left|\frac{\partial s(t)}{\partial t}\right|^2 dt} \quad \text{(A. 4)}$$

using Fourier theory and Parseval's equation, $$\int_0^{T_p}\left|\frac{\partial s(t)}{\partial t}\right|^2 dt = \int_{-\infty}^{\infty}(2\pi f)^2 |S(f)|^2 df \quad \text{(A. 5)}$$

and the signal power $P_s$ is $$P_s = \frac{1}{T_p}\int_0^{T_p}|s(t)|^2 dt \quad \text{(A. 6)}$$

$$= \frac{1}{T_p}\int_{-\infty}^{\infty}|S(f)|^2 df \quad \text{(A. 7)}$$

For a complex linear FM chirp waveform having bandwidth B, make the approximation $$|S(f)| \approx |S(0)|\operatorname{rec} t(f/B) \quad \text{(A.8)}$$

and thus $$\int_{-\infty}^{\infty}(2\pi f)^2 |S(f)|^2 df \quad \text{(A. 9)}$$

$$\approx \int_{-B/2}^{B/2}(2\pi f)^2 |S(0)|^2 df \quad \text{(A. 10)}$$

$$= |S(0)|^2 \frac{\pi^2 B^3}{3} \quad \text{(A. 11)}$$

similarly $$\int_{-\infty}^{\infty}|S(f)|^2 df \quad \text{(A. 12)}$$

$$\approx \int_{-B/2}^{B/2}|S(0)|^2 df \quad \text{(A. 13)}$$

$$= |S(0)|^2 B \quad \text{(A. 14)}$$

therefore $$\sigma_{TOF}^2 \geq \frac{3\sigma_N^2}{2f_s|S(0)|^2 \pi^2 B^3} \quad \text{(A. 15)}$$

Noting that $$|S(0)|^2 = \frac{P_s T_p}{B} \quad \text{(A. 16)}$$

and that $SNR = P_s/\sigma_N^2$, the derivation arrives at the approximate CRLB for time delay estimation $$\sigma_{TOF}^2 \geq \frac{3}{2\pi^2 \cdot B^2 \cdot f_s \cdot T_p \cdot SNR} \quad \text{(A. 17)}$$

Note also that $\sigma_{TOF}^2$ is the CRLB for one way TOF (e.g., TOA or peak) estimation. Because the synchronization method described in this work calculates the synchronized TOF as the mean of two sensors' local TOF measurements (22), which represent two independent observations, the CRLB for the two-way TOF is $\sigma_{2-TOF}^2 = \sigma_{TOF}^2/2$.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for providing wireless clock synchronization of multiple devices, the method comprising:
    performing coarse synchronization by synchronizing clocks of each of the multiple devices using an independent clock source; and
    performing fine clock synchronization by:
        measuring pair-wise radio frequency (RF) time of flight using baseband waveform samples of each of the multiple devices based on the clocks of each of the multiple devices; and
        applying at least one of (i) a fractional delay and (ii) a phase correction to the baseband waveform samples to cause the baseband waveform samples to replicate equivalently synchronized sample clocks.

2. The method of claim 1, wherein the measuring pair-wise radio frequency RF time of flight using baseband waveform samples includes estimating RF time of flight from a peak location of the baseband waveform samples and mutual exchange of information as encoded wireless broadcasts.

3. The method of claim 2, wherein estimating the peak location is performed using at least one of spectral phase slope estimation, quadratic least-squares fitting, or sinc nonlinear least-squares.

4. The method of claim 1, wherein the method is implemented entirely in software.

5. The method of claim 1, wherein the fine clock synchronization provides synchronization with up to 100 picosecond precision with a 50 MHz signal bandwidth.

6. The method of claim 1, wherein the multiple devices each include a sensor with an independent clock.

7. The method of claim 1, wherein the multiple devices form a wireless network.

8. The method of claim 6, wherein the method provides the sensor of each of the multiple devices with complete knowledge of line of sight distance between each pair of sensors to within 2 centimeters to decentralize localization of each of the multiple devices in the network.

9. The method of claim 1, wherein the multiple devices comprises any number of devices.

10. The method of claim 1, further comprising transmitting the baseband waveform samples after applying the at least one of the (i) fractional delay and (ii) the phase correction.

11. The method of claim 1, further comprising transmitting, by the multiple devices, RF signals synchronized in time and phase, wherein the multiple devices act as a single coherent device.

12. The method of claim 1, wherein the independent clock source comprises a global positioning system (GPS) signal.

13. A clock-synchronized wireless communication system comprising:
 a plurality of portable devices, each portable device having a radio transceiver with a clock,
 wherein each portable device of the plurality of portable devices performs coarse clock synchronization by synchronizing the clock with an independent clock source, and
 wherein at least one portable device of the plurality of portable devices performs fine clock synchronization by (i) measuring a pair-wise radio frequency (RF) time of flight between the at least one portable device and at least one further portable device of the plurality of portable devices, and (ii) applying at least one of a fractional delay and a phase correction to a baseband waveform sample to cause the baseband waveform sample to replicate an equivalently synchronized clock.

14. The system of claim 13, wherein the independent clock source comprises a GPS signal.

15. The system of claim 13, wherein the plurality of portable devices form a wireless network.

16. The system of claim 13, wherein each portable device of the plurality of portable devices is an unmanned aerial vehicle of a distributed radar wireless network and the baseband waveform sample comprises at least one of a radar transmission and a radar reflection of a radar target.

17. The system of claim 15, wherein the radio transceiver comprises a time-division multiple access (TDMA) transceiver.

18. A portable device comprising:
 a radio transceiver; and
 an unmanned aerial vehicle carrying the radio transceiver,
 wherein the radio transceiver includes a clock,
 wherein the radio transceiver is configured to perform a coarse clock synchronization by synchronizing the clock with an independent clock source, and
 wherein the radio transceiver is configured to perform a fine clock synchronization by (i) measuring a pair-wise radio frequency (RF) time of flight between the radio transceiver and at least one further radio transceiver of a further portable device, and (ii) applying at least one of a fractional delay and a phase correction to a baseband waveform sample to cause the baseband waveform sample to replicate an equivalently synchronized clock.

19. The device of claim 18, wherein the independent clock source comprises a GPS signal.

20. The device of claim 18, wherein the radio transceiver of the portable device transmits an RF signal synchronized in time and phase with the further portable device, wherein the portable device acts as a single coherent device with the further portable device.

* * * * *